(12) United States Patent
Kataoka et al.

(10) Patent No.: US 11,047,715 B2
(45) Date of Patent: Jun. 29, 2021

(54) SENSOR MOUNTING STRUCTURE FOR ENGINE

(71) Applicant: HONDA MOTOR CO., LTD., Tokyo (JP)

(72) Inventors: Dai Kataoka, Wako (JP); Yuichi Tawarada, Wako (JP); Kenichi Shiratori, Wako (JP); Tomiyuki Sasaki, Wako (JP); Masaki Cho, Wako (JP); Satoru Okoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 16/366,426

(22) Filed: Mar. 27, 2019

(65) Prior Publication Data
US 2019/0301902 A1 Oct. 3, 2019

(30) Foreign Application Priority Data

Mar. 29, 2018 (JP) .............................. JP2018-065353

(51) Int. Cl.
*F01L 1/04* (2006.01)
*G01D 11/30* (2006.01)
(Continued)

(52) U.S. Cl.
CPC .............. *G01D 11/30* (2013.01); *F01L 1/047* (2013.01); *F02D 35/02* (2013.01);
(Continued)

(58) Field of Classification Search
CPC . F01L 2820/041; F01L 2820/04; F01L 1/047; F01L 13/0036; G01D 11/30;
(Continued)

(56) References Cited

U.S. PATENT DOCUMENTS

| 5,293,776 A * | 3/1994 | Takegami ............. G01M 15/06 123/617 |
| 6,557,520 B2 * | 5/2003 | Roberts, Jr. ............. F02B 19/04 123/260 |
| 6,679,107 B1 * | 1/2004 | Ono .......................... F01L 1/34 73/114.63 |
| 6,901,895 B2 * | 6/2005 | Mae ........................ F01L 1/047 123/90.17 |

(Continued)

FOREIGN PATENT DOCUMENTS

| JP | H11-257124 A | 9/1999 |
| JP | 4459130 B2 | 4/2010 |

(Continued)

OTHER PUBLICATIONS

Office Action dated May 28, 2020 issued in the corresponding Indian Patent Application No. 201914006322.

*Primary Examiner* — Gonzalo Laguarda
(74) *Attorney, Agent, or Firm* — Carrier Blackman & Associates, P.C.; William D. Blackman; Joseph P. Carrier

(57) ABSTRACT

A sensor mounting structure for an engine is provided. The sensor mounting structure offers a greater flexibility in mounting a sensor which detects an operation of an actuation member disposed at an inner wall spaced apart from an outer wall of a cylinder head of a valve gear. A sensor mounting structure for an engine includes a valve gear provided at a cylinder head and a sensor detecting an operation of the valve gear. The sensor is mounted on a sensor mounting hole formed at a head inner wall of the cylinder head covered with a cylinder head cover.

17 Claims, 20 Drawing Sheets

(51) Int. Cl.
*F02D 35/02* (2006.01)
*F01L 1/047* (2006.01)
*G12B 9/08* (2006.01)
*F16M 1/026* (2006.01)
*F02M 55/00* (2006.01)
*G01P 13/00* (2006.01)

(52) U.S. Cl.
CPC .......... *F02M 55/005* (2013.01); *F16M 1/026* (2013.01); *G01P 13/00* (2013.01); *G12B 9/08* (2013.01); *F01L 2820/041* (2013.01)

(58) Field of Classification Search
CPC ...... F02D 35/02; F02M 55/005; F16M 1/026; G01P 13/00; G12B 9/08
USPC .......... 73/114.26; 123/90.31, 90.27, 123/90.15–90.18
See application file for complete search history.

(56) References Cited

U.S. PATENT DOCUMENTS

| | | | | |
|---|---|---|---|---|
| 7,080,616 | B2* | 7/2006 | Nakamura | F01L 1/022 123/193.3 |
| 7,343,889 | B2* | 3/2008 | Tooyama | F01L 1/053 123/195 A |
| 7,774,128 | B2* | 8/2010 | Kim | F02D 41/0042 123/325 |
| 8,528,389 | B2 | 9/2013 | Sato et al. | |
| 9,068,528 | B2* | 6/2015 | Sanbyakuda | F01L 1/047 |
| 2018/0202329 | A1* | 7/2018 | Ohtsuka | F02D 13/08 |

FOREIGN PATENT DOCUMENTS

| | | |
|---|---|---|
| JP | 2011-102566 A | 5/2011 |
| JP | 5149268 B2 | 2/2013 |

* cited by examiner

SENSOR MOUNTING STRUCTURE FOR ENGINE

BACKGROUND

1. Technical Field

The present invention relates to an engine including a cylinder head equipped with a valve gear.

2. Description of the Background

An exemplary sensor that detects the operation of a valve gear provided at a cylinder head of an engine is disclosed in Patent Literature 1.

CITATION LIST

Patent Literature

[Patent Literature 1] Japanese Unexamined Patent Application Publication No. 11-257124

The engine disclosed in Patent Literature 1 includes a valve gear in which two parallel camshafts are rotatably pivotally supported by a cylinder head. In the disclosed structure, a camshaft sensor that detects the rotation speed of the camshafts is mounted on a camshaft housing. Between the camshaft housing and the cylinder head, the camshaft are set in and pivotally supported. Alternatively, the camshaft sensor is mounted on the outer wall of the cylinder head.

The engine disclosed in Patent Literature 1 includes the a valve gear in which two parallel camshafts are rotatably pivotally supported by the cylinder head, and the camshaft sensor detecting the rotation speed of the camshafts is mounted on the outer wall of the cylinder head obliquely upward. A detecting part of the camshaft sensor opposes to a sensing rotor which includes a projection for detecting the camshafts.

BRIEF SUMMARY

As disclosed in Patent Literature 1, the sensor mounted on the camshaft housing or on the outer wall of the cylinder head is limited to the one disposed around the camshaft and mainly detects the rotation of the camshaft. There exist no flexibility in disposing a sensor for detecting the operation of the actuation members of the valve gear disposed at the inner wall spaced apart from the outer wall of the cylinder head.

The present invention has been made in view of the foregoing, and an object thereof is to provide a sensor mounting structure for an engine which offers a greater degree of flexibility in disposing a sensor capable of detecting the operation of actuation members disposed at the inner wall of a valve gear spaced apart from the outer wall thereof.

In order to achieve the object stated above, a sensor mounting structure for an engine of the present invention provides: a sensor mounting structure for an engine including: a crankcase; and a cylinder block, a cylinder head, and a cylinder head cover stacked on and fastened integrally with the crankcase in a direction of a cylinder axis which is a central axis of each of cylinders of the engine, the sensor mounting structure including: a valve gear provided at the cylinder head; and a sensor mounted on a sensor mounting hole formed at a head inner wall of the cylinder head covered with the cylinder head cover for detecting an operation of the valve gear.

In this structure, a sensor for detecting an operation of the valve gear is mounted on a sensor mounting hole formed at a head inner wall of the cylinder head covered with the cylinder head cover. Therefore, a greater degree of flexibility in disposing the sensor is provided, and an operation of an actuation member of the valve gear disposed inside the cylinder head is detected with ease.

The above-described structure may further include a tubular member interposed between the cylinder head cover and the head inner wall. The tubular member may have its one end opening opened to outside of the cylinder head cover and its other end opening opposed to the sensor mounting hole.

In this structure, a tubular member is interposed between the cylinder head cover and the head inner wall. The tubular member has its one end opening opened to the outside of the cylinder head cover and has its other end opening opposed to the sensor mounting hole. Thus, using the tubular member, the sensor can be inserted from the one end opening of the tubular member and mounted on the sensor mounting hole to which the other end opening opposes. This facilitates the sensor mounting work.

Additionally, by virtue of the tubular member covering the sensor, the sensor is protected against any external forces.

In the above-described structure, the tubular member may be formed integrally with the cylinder head cover.

In this structure, the tubular member is formed integrally with the cylinder head cover. This reduces the number of components and facilitates the assembling work.

In the above-described structure, the tubular member has a shape of a tube whose tube central axis is inclined relative to the cylinder axis by a certain angle.

In this structure, the tubular member has a shape of a tube whose tube central axis is inclined relative to the cylinder axis by a certain angle. Therefore, in the cylinder head cover whose width in the cylinder axis direction is limited and which forms narrow space, the tubular member is provided with a greater length when disposed inclined relative to the cylinder axis than when disposed parallel to the cylinder axis. This minimizes the risk of the sensor projecting from the tubular member.

In the above-described structure, the engine may be an inline multi-cylinder engine. A spark plug may be mounted on the cylinder head for each of the cylinders. The sensor may be disposed between two adjacent ones of the spark plugs.

In this structure, the engine is an inline multi-cylinder engine. A spark plug is mounted on the cylinder head for each of the cylinders. The sensor is disposed between two adjacent ones of the spark plugs. Thus, the space between the adjacent two spark plugs is effectively used in disposing the sensor in a compact manner, contributing to downsizing the engine.

In the above-described structure, the valve gear may include two parallel camshafts rotatably pivotally supported at the cylinder head, and the sensor may be disposed between the two camshafts.

In this structure, two parallel camshafts are rotatably pivotally supported at the cylinder head, and the sensor is disposed between the two camshafts. Thus, the space between the two camshafts is effectively used in disposing the sensor in a compact manner, contributing to downsizing the engine.

In the above-described structure, the valve gear may include: the camshaft oriented in a vehicle width direction and rotatably provided at the cylinder head; a cam carrier as a cylindrical member axially slidably fitting to an outer circumference of the camshaft while prohibited from relatively rotating, a plurality of cam lobes being different in cam profile from each other being formed axially adjacent to each other in an outer circumferential surface of the cam carrier; and a cam switch mechanism for axially shifting the switch drive shaft to shift the cam carrier, to switch the cam lobes acting on a valve. The sensor may be a limit switch that detects a recess or a projection provided at the switch drive shaft.

In this structure, the valve gear is a variable valve gear including the camshaft, a cam carrier having a plurality of cam lobes being different in cam profile from each other, and a cam switch mechanism that shifts the switch drive shaft to switch the cam lobes during engine operation. The sensor is a limit switch that detects a recess or a projection provided at the switch drive shaft. Therefore, despite the switch drive shaft being disposed inside the cylinder head, the sensor, mounted on the head inner wall of the cylinder head, detects an axial shift of the switch drive shaft with ease.

In the above-described structure, the switch drive shaft may include a plurality of the recesses or projections, and a separate sensor is disposed for each of the recesses or projections.

In this structure, the switch drive shaft includes a plurality of the recesses or projections, and a separate sensor is disposed for each of the recesses or projections. Therefore, when one sensor fails, another sensor detects shifting of the switch drive shaft. Thus, improved reliability is provided.

The above-described structure may further include a plurality of the switch drive shafts. At least one sensor may be disposed for each of the switch drive shafts.

This structure includes a plurality of switch drive shafts. At least one sensor is disposed for each of the switch drive shafts. Therefore, shifting is detected for each of the switch drive shafts.

In the present invention, a sensor detecting the operation of a valve gear is mounted on a sensor mounting hole formed at a head inner wall of the cylinder head covered with the cylinder head cover. Therefore, a greater degree of flexibility in disposing the sensor is provided, and an operation of an actuation member of the valve gear disposed inside the cylinder head is detected with ease.

DETAILED DESCRIPTION

In the following, with reference to the drawings, a description will be given of an embodiment of the present invention.

Figure 1:
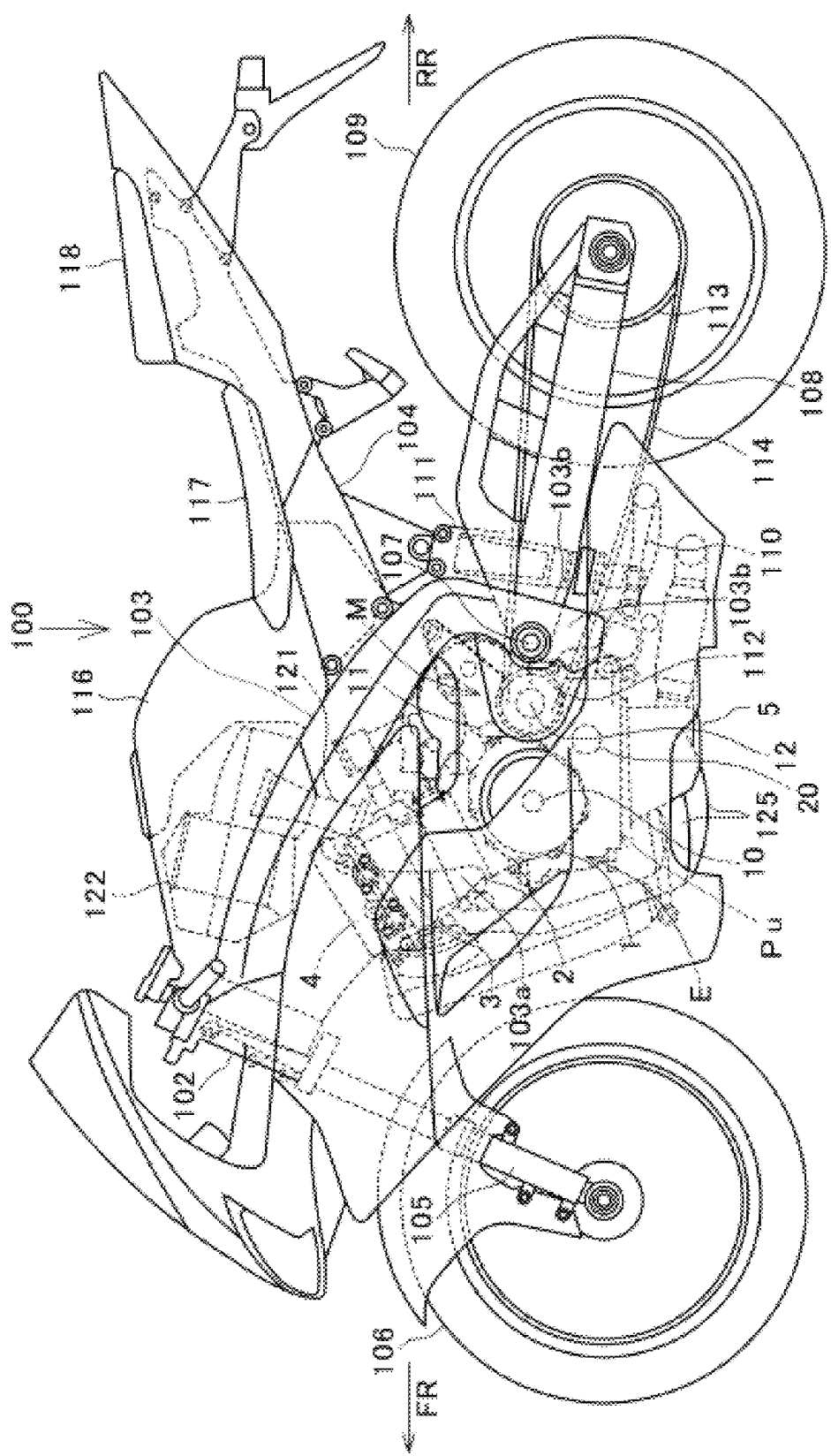
FIG. 1 is an overall side view of a motorcycle equipped with a power unit including an engine according to an embodiment of the present invention.

FIG. 1 is a side view of a motorcycle 100 which is a saddled vehicle equipped with an engine according to an embodiment of the present invention.

In the description and claims, the front, rear, right, and left directions are based on the normal standards in which the forward direction of the motorcycle 100 according to the present embodiment is the front direction. In the drawings, FR represents front, RR represents rear, RH represents right, and LH represents left.

In the vehicle body frame of the motorcycle 100, a right and left pair of main frames 103 branches rightward and leftward and obliquely downward rearward from a head pipe 102 which steerably supports a front fork 105 pivotally supporting a front wheel 106.

From the front part of the main frames 103, an engine hanger unit 103*a* suspends downward. The rear part of the main frames 103 is bent, where a pivot frame unit 103*b* extends downward.

To the rearward center of the main frames 103, a seat rail 104 is coupled and extends rearward.

A swingarm 108 having its front end pivotally supported by a pivot shaft 107 in the pivot frame unit 103*b* extends rearward. A rear wheel 109 is pivotally supported at the rear end of the swingarm 108.

Between the swingarm 108 and the pivot frame unit 103*b*, a link mechanism 110 is provided, and a rear cushion 111 is interposed between part of the link mechanism 110 and the seat rail 104.

In the vehicle body frame, between the engine hanger unit 103*a* of the main frames 103 and the pivot frame unit 103*b*, a power unit Pu is suspended. Between a driving sprocket 112 fitted to the output shaft, which is a countershaft 12, of a transmission M of the power unit Pu and a driven sprocket 113 fitted to the rear axle of the rear wheel 109, a roller chain 114 is wrapped.

In the main frames 103, an air cleaner 122 is suspended from the front half thereof and a fuel tank 116 is suspended from the rear half thereof. Behind the fuel tank 116, a main seat 117 and a pillion seat 118 are supported by the seat rail 104.

An engine E occupying the front half of the power unit Pu is a transverse inline-four water-cooled four-stroke engine, and mounted on the vehicle body frame having its cylinders properly inclined frontward.

A crankshaft 10 of the engine E is oriented in the vehicle width direction (the right-left direction) and pivotally supported by a crankcase 1. The crankcase 1 integrally includes the transmission M behind the crankshaft 10.

Figure 2:
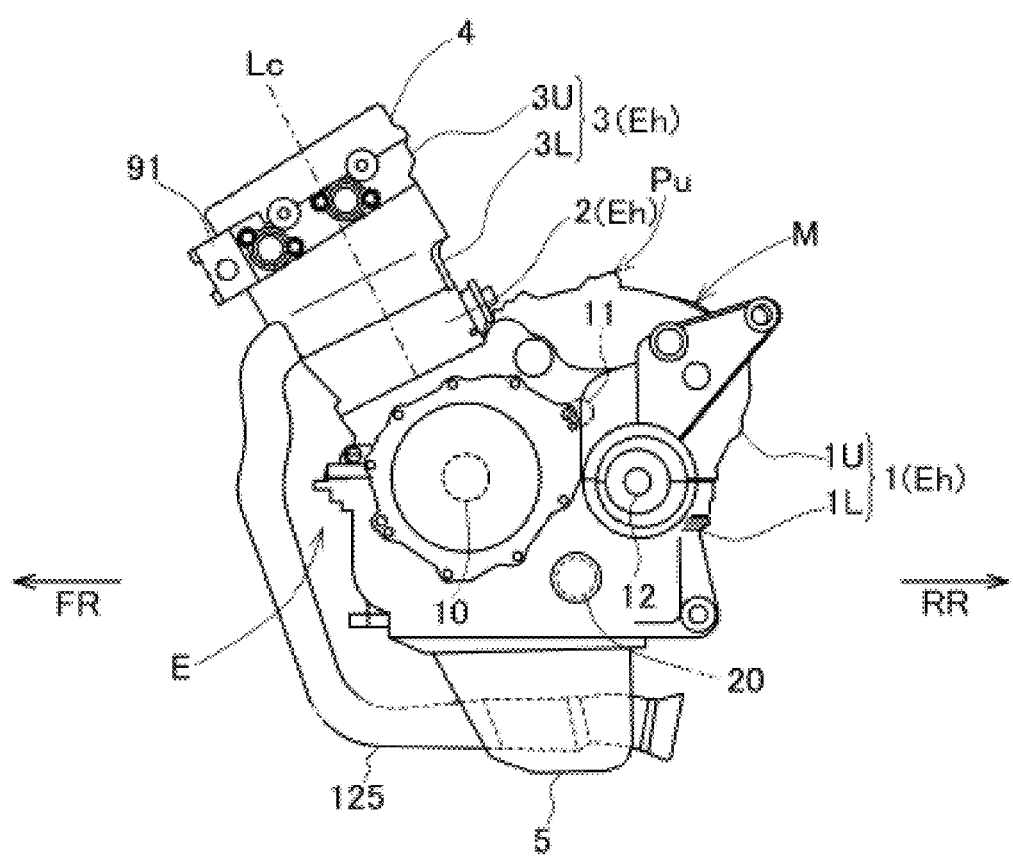
FIG. 2 is a left side view of the power unit.

With reference to FIG. 2, the engine E includes an engine body Eh formed of: the crankcase 1; a cylinder block 2 disposed on the crankcase 1 and having four cylinders arranged in line; a cylinder head 3 coupled to the upper part of the cylinder block 2 via a gasket; and a cylinder head cover 4 covering the upper part of the cylinder head 3.

A cylinder axis Lc which is the central axis of the cylinders of the cylinder block 2 is inclined frontward. The cylinder block 2, the cylinder head 3, and the cylinder head cover 4 stacked on the crankcase 1 extend upward while slightly inclined frontward from the crankcase 1.

Provided below the crankcase 1 is an oil pan 5 bulging downward.

The crankcase 1 is formed of the upper and lower halves. Between the surfaces along which the crankcase 1 is halved into an upper crankcase 1U and a lower crankcase 1L, the crankshaft 10 is pivotally supported.

The crankcase 1 includes the transmission M behind the crankshaft 10. A main shaft 11 and the countershaft 12 forming the transmission M are oriented in the vehicle width direction parallel to the crankshaft 10 and pivotally supported by the crankcase 1 (see FIG. 2).

Figure 3:
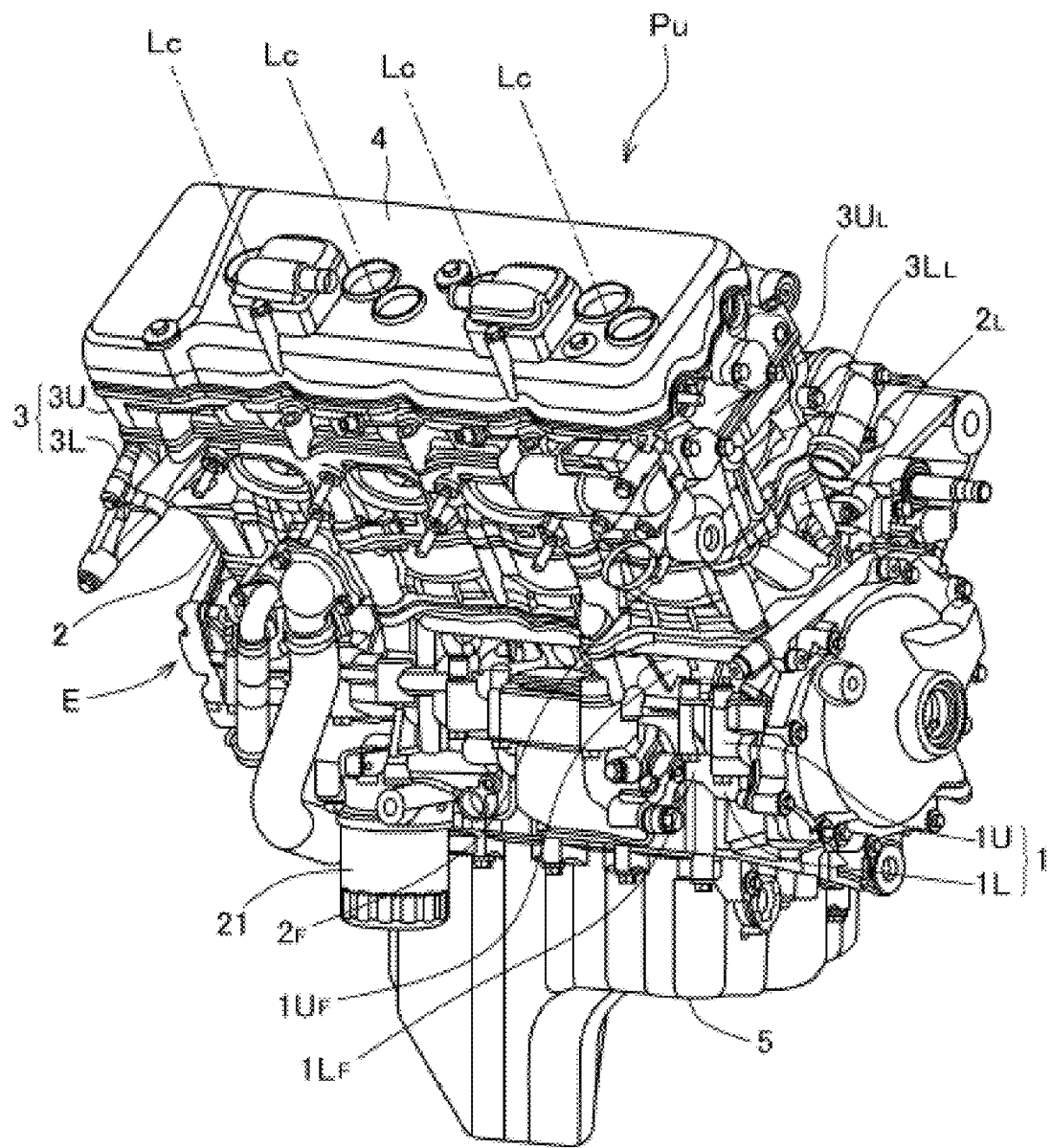
FIG. 3 is a perspective view of the power unit.

In a transmission chamber of the crankcase 1, the main shaft 11 and the countershaft 12 of the transmission M are disposed while being oriented in the right-left horizontal direction parallel to the crankshaft 10 (see FIG. 3). The countershaft 12 penetrates through the crankcase 1 leftward and projects outside, serving as the output shaft.

To the rear surface of the cylinder head 3, intake tubes respectively extend from the cylinders are connected to the air cleaner 122 via a throttle body 121 (see FIG. 1).

From the front surface of the cylinder head 3, exhaust tubes 125 respectively extend from the cylinders. The exhaust tubes 125 extend downward and bent rearward, to extend rearward on the right side of the oil pan 5.

The engine E includes a variable valve gear 40 which has the four-valve DOHC structure in the cylinder head 3.

Figure 4:
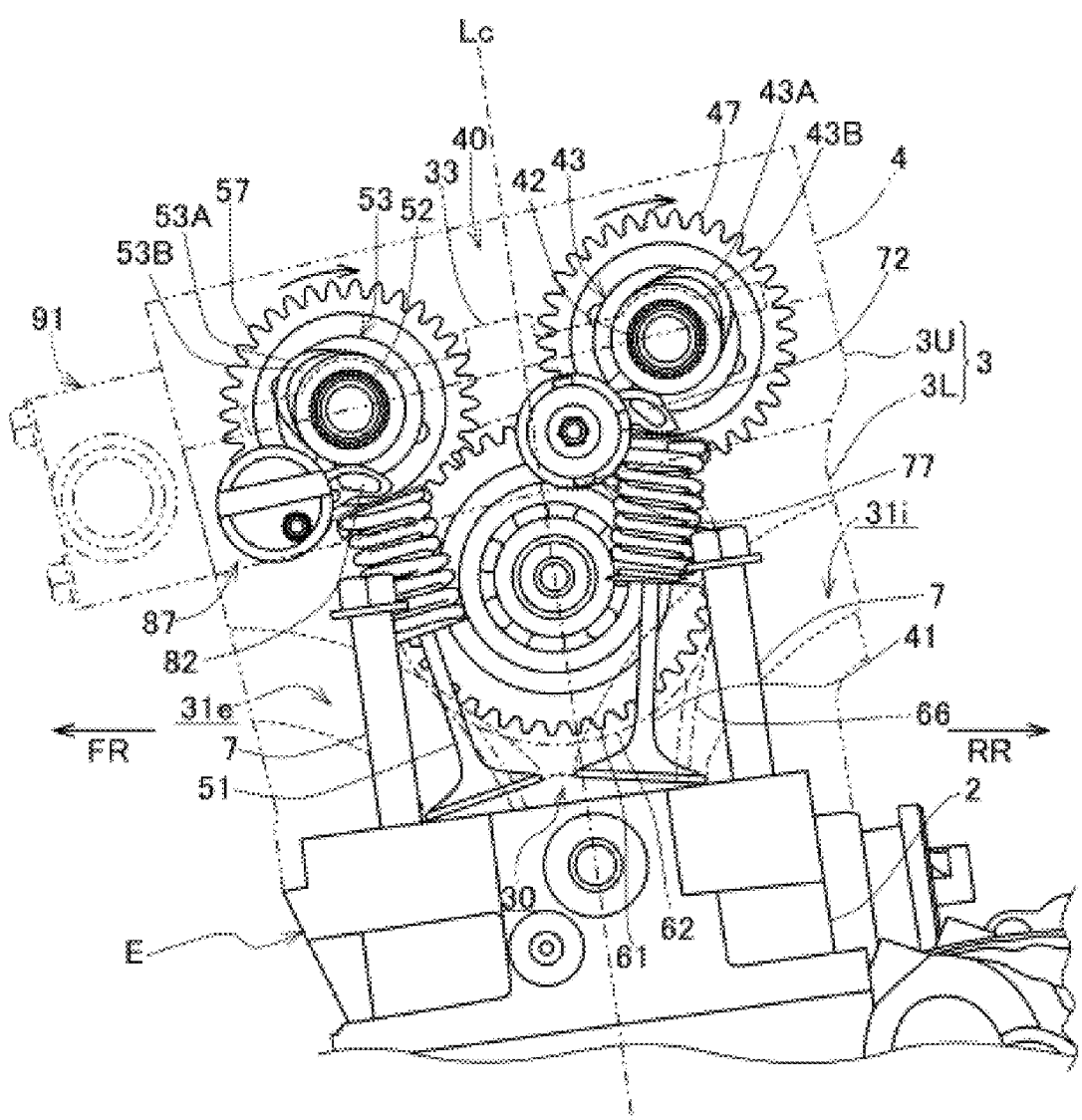
FIG. 4 is a left side view in which the contour of a cylinder head and the like of the engine is represented by a dashed-two dotted line so as to shown the main part of a valve gear inside in a transparent manner.

The cylinder head 3 of the engine E is divided into upper and lower halves in the cylinder axis direction (the axial direction of the cylinder axis Lc), and formed of the lower cylinder head 3L stacked on the cylinder block 2, and the upper cylinder head 3U stacked on the lower cylinder head 3L (see FIGS. 2 and 4).

With reference to FIG. 4, in the lower cylinder head 3L, for each cylinder, two intake ports 31i curved rearward extend obliquely upward from a combustion chamber 30, and two exhaust ports 31e curved frontward extend.

In the lower cylinder head 3L, intake valves 41 and exhaust valves 51 which open or close the intake openings of the intake ports 31i to the combustion chamber 30 and the exhaust openings of the exhaust ports 31e to the combustion chamber 30, respectively, are reciprocatively slidably supported in synchronization with the rotation of the crankshaft 10.

Figure 5:
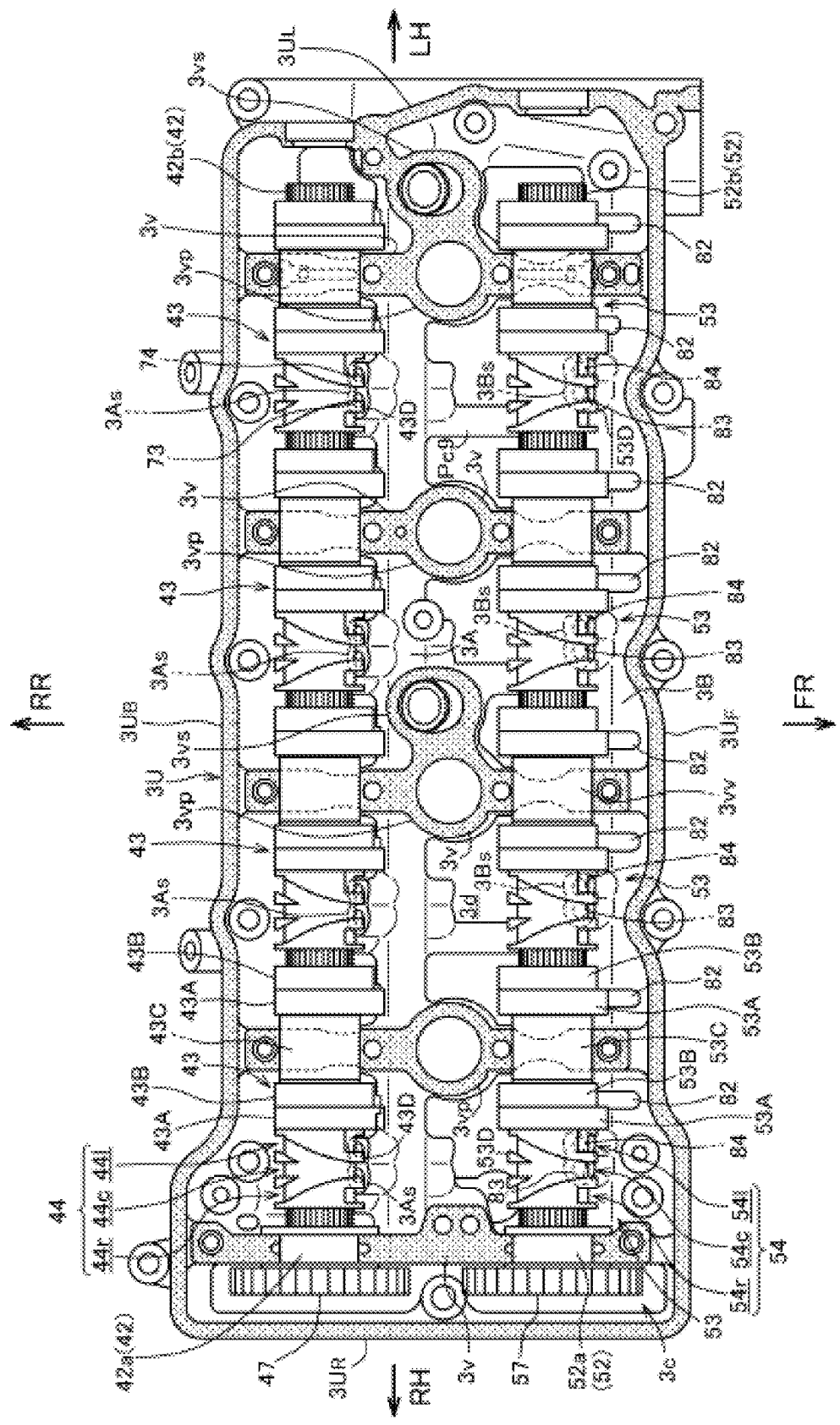
FIG. 5 is a top view of an upper cylinder head as seen from above without a cylinder head cover and a camshaft holder.

The lower cylinder head 3L and the cylinder block 2 are integrally fastened to the upper crankcase 1U with stud bolts 7 (see FIGS. 4 and 5).

With reference to FIG. 5 which is a top view, the upper cylinder head 3U stacked on the lower cylinder head 3L forms a quadrangular-frame wall by four side walls, namely, a front wall $3U_F$ and a rear wall $3U_B$ positioned respectively on the front and rear sides having a great length extending in the right-left direction, and a left side wall $3U_L$ and a right side wall $3U_R$ positioned respectively on the left and right sides having a small length extending in the front-rear direction.

Inside of the quadrangular frame of the upper cylinder head 3U is partitioned, by a bearing wall 3v formed parallel to the right side wall 3UR, into a cam chain chamber 3c which is smaller and positioned on the right side, and a valve chamber 3d positioned on the left side. The valve chamber 3d is further partitioned into five chambers by four bearing walls 3v parallel to the right and left side walls $3U_L$, 3UR.

Each of the bearing walls 3v is positioned above the center of the combustion chamber 30 of corresponding one of the cylinders, and provided with, at its center in the front-rear direction, a plug insertion pipe 3vp for a spark plug 32 to be inserted.

The variable valve gear 40 is provided in the valve chamber 3d formed by the cylinder head 3 and the cylinder head cover 4.

With reference to FIGS. 4 and 5, four right and left pairs of intake valves 41, 41 respectively provided for the inline four cylinders are arranged in line in the right-left direction. On the four pairs of intake valves 41, 41, one intake-side camshaft 42 is disposed so as to be oriented in the right-left direction. The intake-side camshaft 42 is rotatably pivotally supported by fitting to bearing surfaces 3vf, which respectively form semi-arc surfaces of bearing walls 3v of the upper cylinder head 3U, so as to be set in the camshaft holder 33.

Similarly, four right and left pair of exhaust valves 51, 51 respectively provided for the cylinders are arranged in line in the right-left direction. On the four pairs of exhaust valves 51, 51, one exhaust-side camshaft 52 is disposed so as to be oriented in the right-left direction, and rotatably pivotally supported by the bearings of the bearing walls 3v of the upper cylinder head 3U so as to be set in the camshaft holder 33.

The exhaust-side camshaft 52 is disposed on the front side of the intake-side camshaft 42 in parallel thereto.

With reference to FIG. 5, the intake-side camshaft 42 includes, around its right end, a journal part (borne part) 42a pivotally supported by the bearing wall 3v. The intake-side camshaft 42 is axially positioned by flanges on the opposite sides relative to the borne part 42a via the bearing wall 3v. The left part of the intake-side camshaft 42 relative to the borne part 42a forms a spline shaft part 42b provided with spline outer teeth along its outer circumferential surface, which spline shaft part 42b extends in an elongated manner penetrating through four bearing walls 3v of the valve chamber 3d.

To the right end flange of the intake-side camshaft 42 projecting into the cam chain chamber 3c, an intake-side driven gear 47 is fitted.

Similarly, the exhaust-side camshaft 52 includes, around its right end, a journal part (borne part) 52a pivotally supported by the bearing wall 3v. The exhaust-side camshaft 52 is axially positioned by flanges on the opposite sides relative to the borne part 52a via the bearing wall 3v. The left part of the exhaust-side camshaft 52 relative to the borne part 52a forms a spline shaft part 52b provided with spline outer teeth along its outer circumferential surface, which spline shaft part 52b extends in an elongated manner penetrating through four bearing walls 3v of the valve chamber 3d.

To the right end flange of the exhaust-side camshaft 52 projecting into the cam chain chamber 3c, an exhaust-side driven gear 57 is fitted.

Along the spline shaft part 42b of the intake-side camshaft 42, four intake-side cam carriers 43 which are cylindrical members are spline-fitted.

The four intake-side cam carriers 43 are axially slidably fit to the intake-side camshaft 42 while prohibited from rotating relative to the intake-side camshaft 42.

Similarly, along the spline shaft part 52b of the exhaust-side camshaft 52, four exhaust-side cam carriers 53 which are cylindrical members are spline-fitted. The four exhaust-side cam carriers 53 are axially slidably fit to the exhaust-side camshaft 52 while prohibited from rotating relative to the exhaust-side camshaft 52.

Figure 6:
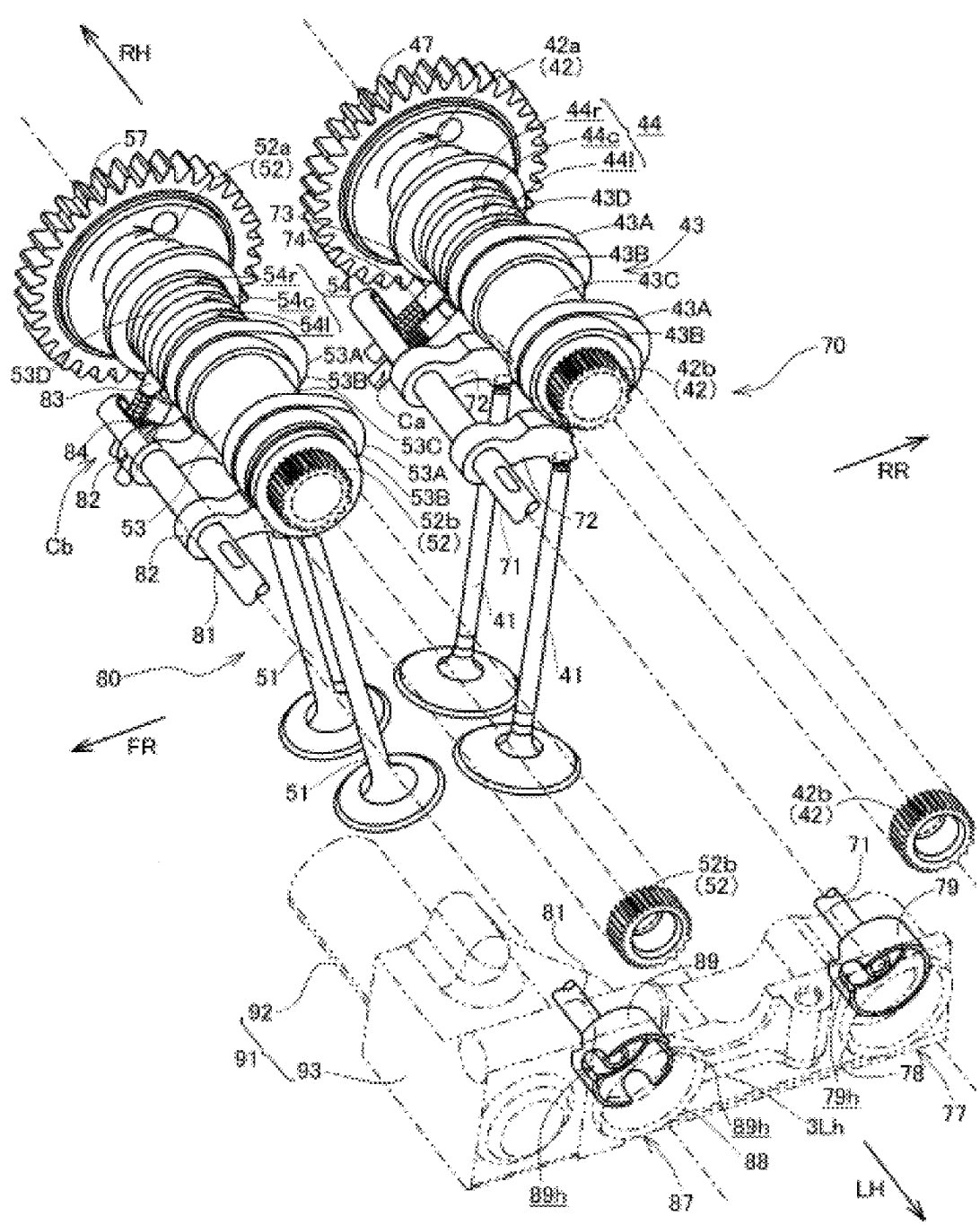
FIG. 6 is a perspective view partially omitting an intake-side cam switch mechanism and an exhaust-side cam switch mechanism so as to show just the main part.

FIG. 6 is a perspective view partially omitting an intake-side cam switch mechanism and an exhaust-side cam switch mechanism so as to show just the main part.

With reference to FIGS. 6 (and 5), each of the intake-side cam carriers 43 is formed of a set of: two pairs of high-speed-side cam lobes 43A with a greater lift amount and low-speed-side cam lobes 43B with a smaller lift amount differing from each other in cam profile of the outer circumferential surface, in each pair, the high-speed-side cam lobe 43A and the low-speed-side cam lobe 43B being adjacent to each other in the axial right and left direction; and a borne cylindrical part 43C having a predetermined axial width and inserted between the two right and left pairs of high-speed-side cam lobes 43A and low-speed-side cam lobes 43B.

The adjacent high-speed-side cam lobe 43A and low-speed-side cam lobe 43B are identical to each other in the outer diameter of the base circle of the cam profile, and their base circles are at the identical circumferential position (see FIGS. 4 and 5).

Each of the intake-side cam carriers 43 includes, on the right side of the right pair of high-speed-side cam lobe 43A and low-speed-side cam lobe 43B, a lead groove cylindrical part 43D around which lead grooves 44 are circumferentially formed.

The outer diameter of the lead groove cylindrical part 43D is slightly smaller than the outer diameter of the base circle which is common to the high-speed-side cam lobe 43A and the low-speed-side cam lobe 43B.

The lead grooves 44 of the lead groove cylindrical part 43D include an annular lead groove 44c which circumferentially runs in a closed ring-like manner at an axial predetermined position, a right shift lead groove 44r and a left shift lead groove 44l branching rightward and leftward from the annular lead groove 44c spirally to positions distanced by a predetermined distance in the axially right and left directions, respectively (see FIG. 5).

Four pieces of such intake-side cam carriers 43 are successively spline-fitted to the spline shaft part 42b of the intake-side camshaft 42 at predetermined intervals.

As shown in FIG. 5, the intake-side camshaft 42 equipped with the four intake-side cam carriers 43 is pivotally supported by the rear bearing surfaces of the five bearing walls 3v of the upper cylinder head 3U.

The borne part 42a of the intake-side camshaft 42 is supported by the right bearing wall 3v, and the borne cylindrical parts 43C of the intake-side cam carriers 43 are supported by the bearing walls 3v.

Similarly to the intake-side cam carriers 43, each of the exhaust-side cam carriers 53 spline-fitted to the spline shaft part 52b of the exhaust-side camshaft 52 is also formed of a set of: two pairs of high-speed-side cam lobes 53A and low-speed-side cam lobes 53B differing from each other in cam profile of the outer circumferential surface, in each pair, the high-speed-side cam lobe 53A and the low-speed-side cam lobe 53B being adjacent to each other in the axial right and left direction; and a borne cylindrical part 53C having a predetermined axial width and inserted between the two right and left pairs of high-speed-side cam lobe 53A and low-speed-side cam lobe 53B. Each of the exhaust-side cam carriers 53 includes, on the right side of the right pair of high-speed-side cam lobe 53A and low-speed-side cam lobe 53B, a lead groove cylindrical part 53D.

Lead grooves 54 formed at the lead groove cylindrical part 53D include an annular lead groove 54c which circumferentially runs in a closed ring-like manner, and a right shift lead groove 54r and a left shift lead groove 54l branching rightward and leftward from the annular lead groove 54c spirally to positions distanced by a predetermined distance in the axially right and left directions, respectively (see FIG. 5).

As shown in FIG. 5, the exhaust-side camshaft 52 equipped with four pieces of such exhaust-side cam carriers 53 successively spline-fitted to the spline shaft part 52b is pivotally supported by the front bearing surfaces of the five bearing walls 3v of the upper cylinder head 3U.

The borne part 52a of the exhaust-side camshaft 52 is supported by the right bearing wall 3v, and the borne cylindrical parts 53C of the exhaust-side cam carriers 53 are supported by the bearing walls 3v.

In the foregoing manner, when the intake-side camshaft 42 (and the intake-side cam carriers 43) and the exhaust-side camshaft 52 (and the exhaust-side cam carriers 53) are supported by the five bearing walls 3v of the upper cylinder head 3U, by the camshaft holder 33 (see FIG. 4) being stacked on the five bearing walls 3v, the intake-side camshaft 42 (and the intake-side cam carriers 43) and the exhaust-side camshaft 52 (and the exhaust-side cam carriers 53) are set in and rotatably pivotally supported. As used throughout the present description, the term "rotatably pivotally supported" means the same thing as rotatably supported, that is, supported in such a manner as to permit rotation thereof in relation to the supporting structure.

That is, the four intake-side cam carriers 43 are axially slidably and rotatably pivotally supported while rotating with the intake-side camshaft 42. The four exhaust-side cam carriers 53 are also axially slidably and rotatably pivotally supported while rotating with the exhaust-side camshaft 52.

The intake-side driven gear 47 mounted on the right end of the intake-side camshaft 42 and the exhaust-side driven gear 57 mounted on the right end of the exhaust-side camshaft 52 are identical to each other in diameter, and juxtaposed to each other on the rear side and the front side in the cam chain chamber 3c. As shown in FIG. 4, a large-diameter idle gear 61 meshing both the intake-side driven gear 47 and the exhaust-side driven gear 57 is rotatably pivotally supported beneath the position between the intake-side driven gear 47 and the exhaust-side driven gear 57.

With reference to FIGS. 4 and 5, the idle gear 61 is provided with a coaxial idle chain sprocket 62 so as to be integrally rotatable. A cam chain 66 is wrapped around the idle chain sprocket 62. The cam chain 66 is wrapped around also a small-diameter drive chain sprocket (not shown) fitted to the crankshaft 10 positioned below.

Accordingly, the rotation of the crankshaft 10 is transferred to the idle chain sprocket 62 via the cam chain 66, whereby the rotation of the idle gear 61 which rotates integrally with the idle chain sprocket 62 rotates the intake-side driven gear 47 and the exhaust-side driven gear 57 meshing with the idle gear 61. Therefore, the intake-side driven gear 47 integrally rotates the intake-side camshaft 42, and the exhaust-side driven gear 57 integrally rotates the exhaust-side camshaft 52.

With reference to FIG. 6, an intake-side switch drive shaft 71 of an intake-side cam switch mechanism 70 is disposed frontward obliquely below and parallel to the intake-side camshaft 42. An exhaust-side switch drive shaft 81 of an exhaust-side cam switch mechanism 80 is disposed frontward obliquely below and parallel to the exhaust-side camshaft 52.

The intake-side switch drive shaft 71 and the exhaust-side switch drive shaft 81 are supported by the upper cylinder head 3U.

Figure 12:
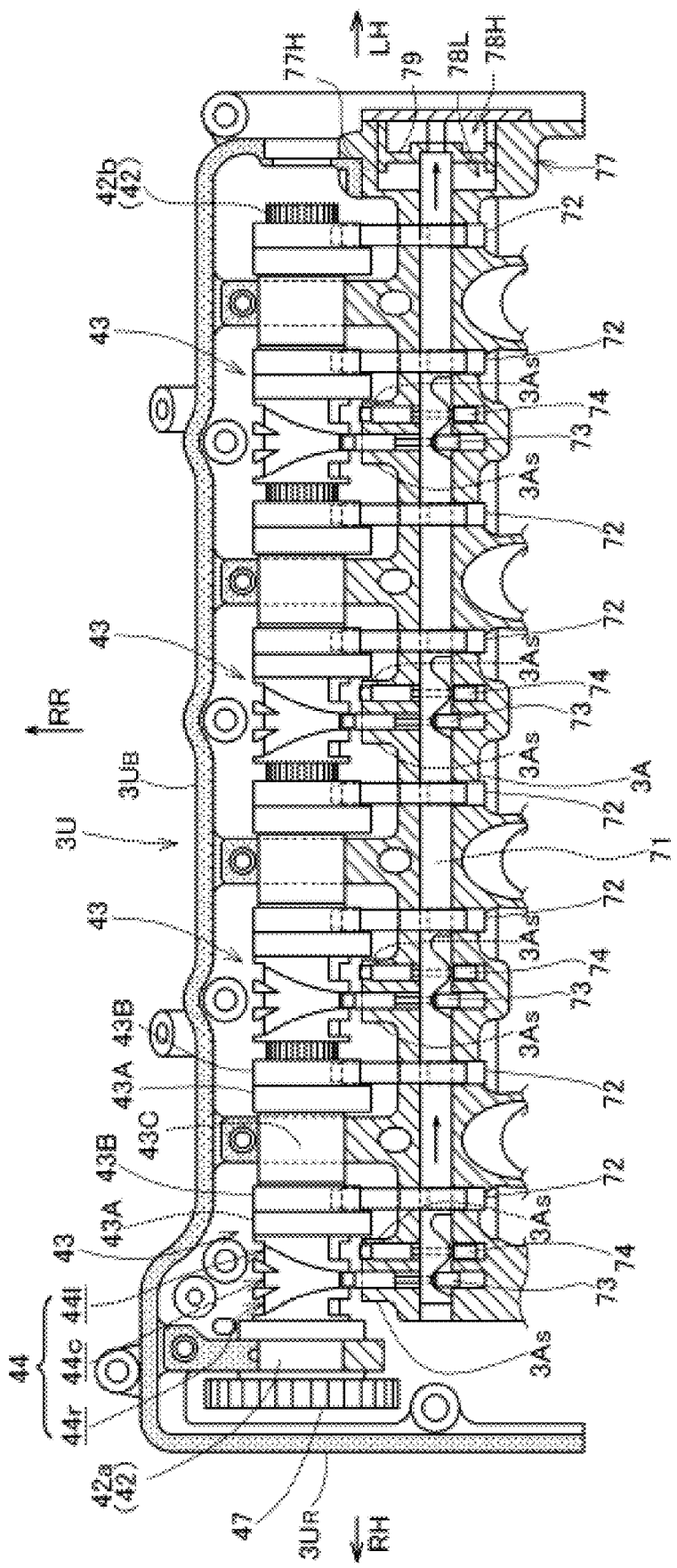
FIG. 12 is an explanatory view showing the operation of main members of the intake-side cam switch mechanism in a low-speed drive mode of the engine.

With reference to FIGS. 5, 6, and 12, in the upper cylinder head 3U, a tubular part 3A oriented in the right-left direction in the valve chamber 3*d* is formed straight at a position slightly rearward than the center to penetrate through the five bearing walls 3*v*.

Similarly, in the upper cylinder head 3U, a tubular part 3B oriented in the right-left direction in the valve chamber 3*d* is formed straight at the inner surface of the front wall 3U$_F$ to penetrate through the five bearing walls 3*v* (see FIG. 5).

The intake-side switch drive shaft 71 is axially slidably fitted into the axial hole of the tubular part 3A, and the exhaust-side switch drive shaft 81 is axially slidably fitted into the axial hole of the tubular part 3B.

Two opposite portions with reference to the bearing wall 3*v* in the tubular part 3A corresponding to the right and left intake valves 41, 41 are absent, to expose the intake-side switch drive shaft 71. By the portions exposing the intake-side switch drive shaft 71, intake rocker arms 72, 72 are swingably pivotally supported (see FIGS. 5 and 12).

That is, the intake-side switch drive shaft 71 also functions as the rocker arm shaft.

With reference to FIGS. 4 and 6, the tip of each intake rocker arm 72 abuts on the upper end of the intake valve 41. Onto the curved upper end surface of the intake rocker arm 72, the high-speed-side cam lobe 43A or the low-speed-side cam lobe 43B slidably abuts by the intake-side cam carrier 43 shifting in the axial direction.

Accordingly, as the intake-side cam carrier 43 rotates, the high-speed-side cam lobe 43A or the low-speed-side cam lobe 43B swings the intake rocker arm 72 according to its profile, to press the intake valve 41 to open the intake valve port at the combustion chamber 30.

Similarly, two opposite portions with reference to the bearing wall 3V in the tubular part 3B corresponding to the right and left exhaust valves 51, 51 are absent, to expose the exhaust-side switch drive shaft 81. By the portions exposing the exhaust-side switch drive shaft 81, exhaust rocker arms 82 are swingably pivotally supported (see FIGS. 5 and 6).

That is, the exhaust-side switch drive shaft 81 also functions as the rocker arm shaft.

With reference to FIGS. 4 and 6, the tip of each exhaust rocker arm 82 abuts on the upper end of the exhaust valve 51. Onto the curved upper end surface of the exhaust rocker arm 82, the high-speed-side cam lobe 53A or the low-speed-side cam lobe 53B slidably abuts by the exhaust-side cam carrier 53 shifting.

Accordingly, as the exhaust-side cam carrier 53 rotates, the high-speed-side cam lobe 53A or the low-speed-side cam lobe 53B swings the exhaust rocker arm 82 according to its profile, to press the exhaust valve 51 to open the discharge valve port at the combustion chamber 30.

With reference to FIG. 12, at the portions corresponding to the lead groove cylindrical part 43D of each intake-side cam carrier 43, two adjacent right and left cylindrical boss parts 3As, 3As are formed in the tubular part 3A, so as to project toward the lead groove cylindrical part 43D.

The hole inside the cylindrical boss part 3As penetrates through the tubular part 3A.

Into the holes inside the cylindrical boss parts 3As, 3As, a first switch pin 73 and a second switch pin 74 are respectively slidably inserted.

Figure 7:
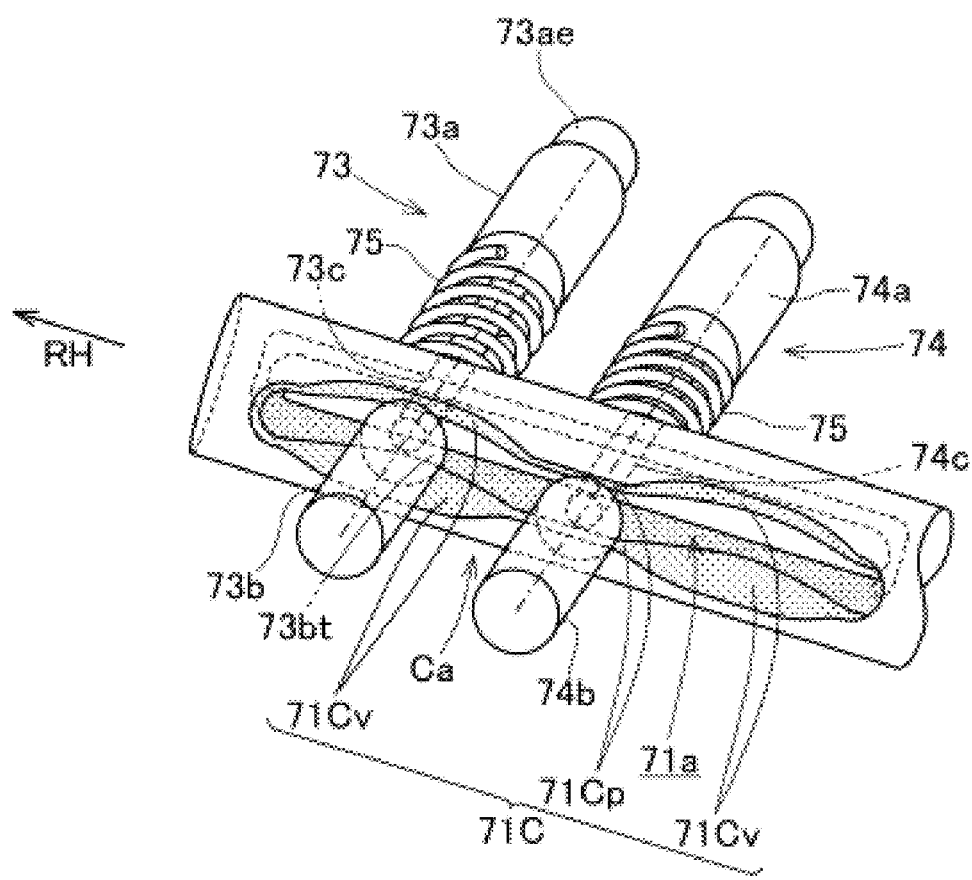
FIG. 7 is a perspective view of an intake-side switch drive shaft to which a first switch pin and a second switch pin are mounted.

With reference to FIG. 7, the first switch pin 73 is formed of a leading-end columnar part 73*a*, a basal-end columnar part 73*b*, and an intermediate coupling bar part 73*c* straightly coupling the leading-end columnar part 73*a* and the basal-end columnar part 73*b*.

The basal-end columnar part 73*b* is smaller in outer diameter than the leading-end columnar part 73*a*.

From the leading-end columnar part 73*a*, a smaller-diameter engaging end 73*ae* further projects.

The end surface of the basal-end columnar part 73*b* on the intermediate coupling bar part 73*c* side forms a truncated cone end surface 73*bt* of a cone.

The second switch pin 74 is similar in shape, and includes a leading-end columnar part 74*a*, a basal-end columnar part 74*b*, and an intermediate coupling bar part 74*c* straightly coupling the leading-end columnar part 74*a* and the basal-end columnar part 74*b*.

As shown in FIG. 7, the intake-side switch drive shaft 71 is provided with a long hole 71*a* penetrating through the axial center. The width of the long hole 71*a* is slightly greater than the diameter of the intermediate coupling bar part 73*c* of the first switch pin 73, and smaller than the diameter of the basal-end columnar part 73*b*.

One opening end surface of the long hole 71*a* of the intake-side switch drive shaft 71 is provided with a cam surface 71C in which two recessed curved surfaces 71Cv being recessed in a predetermined shape on the right and left sides and continuous to each other via a flat surface 71Cp are formed.

The first switch pin 73 is mounted in the state where the intermediate coupling bar part 73*c* penetrates through the long hole 71*a* of the intake-side switch drive shaft 71, and the truncated cone end surface 73*bt* of the basal-end columnar part 73*b* biased by the coil spring 75 is pressed against and engages with the cam surface 71C, which is the opening end surface of the long hole 71*a* of the intake-side switch drive shaft 71. This structures a direct-acting cam mechanism Ca, in which: the intake-side switch drive shaft 71 axially shifting shifts the cam surface 71C on which the truncated cone end surface 73*bt* of the basal-end columnar part 73*b* of the first switch pin 73 abuts, which truncated cone end surface 73*bt* is at an axially fixed position and configured to shift in the direction perpendicular to the axial direction; whereby the first switch pin 73 advances or retracts perpendicularly to the axial direction guided by the shape of the cam surface 71C.

As shown in FIG. 7, the first switch pin 73 and the second switch pin 74 are disposed parallel to each other penetrating through the common long hole 71a of the intake-side switch drive shaft 71.

FIG. 7 shows the state where, in the cam surface 71C of the intake-side switch drive shaft 71, the center of the recessed curved surface 71Cv is at the position of the first switch pin 73. The first switch pin 73 is at the advanced position having its truncated cone end surface 73bt abutted on the recessed curved surface 71Cv. The second switch pin 74 is at the retracted position abutting on the flat surface 71Cp in the cam surface 71C.

When the intake-side switch drive shaft 71 shifts rightward from this state, the truncated cone end surface 73bt of the first switch pin 73 ascends the slope of the recessed curved surface 71Cv from the center of the recessed curved surface 71Cv thereby retracting, to abut on the flat surface 71Cp. The truncated cone end surface 74bt of the second switch pin 74 descends the slope of the recessed curved surface 71Cv from the flat surface 71Cp thereby advancing, to abut on the center of the recessed curved surface 71Cv.

In this manner, the axial shift of the intake-side switch drive shaft 71 causes the first switch pin 73 and the second switch pin 74 to alternately advance and retract.

While not shown in the drawings, in the tubular part 3B into which the exhaust-side switch drive shaft 81 is axially slidably inserted, similarly to the tubular part 3A, two cylindrical boss parts 3Bs, 3Bs into which the first switch pin 83 and the second switch pin 84 are respectively slidably inserted are formed adjacent to each other on the right and left sides. The first switch pin 83 and the second switch pin 84 are disposed parallel to each other penetrating through a common long hole 81a of the exhaust-side switch drive shaft 81 (see FIGS. 5 and 6).

Figure 8:
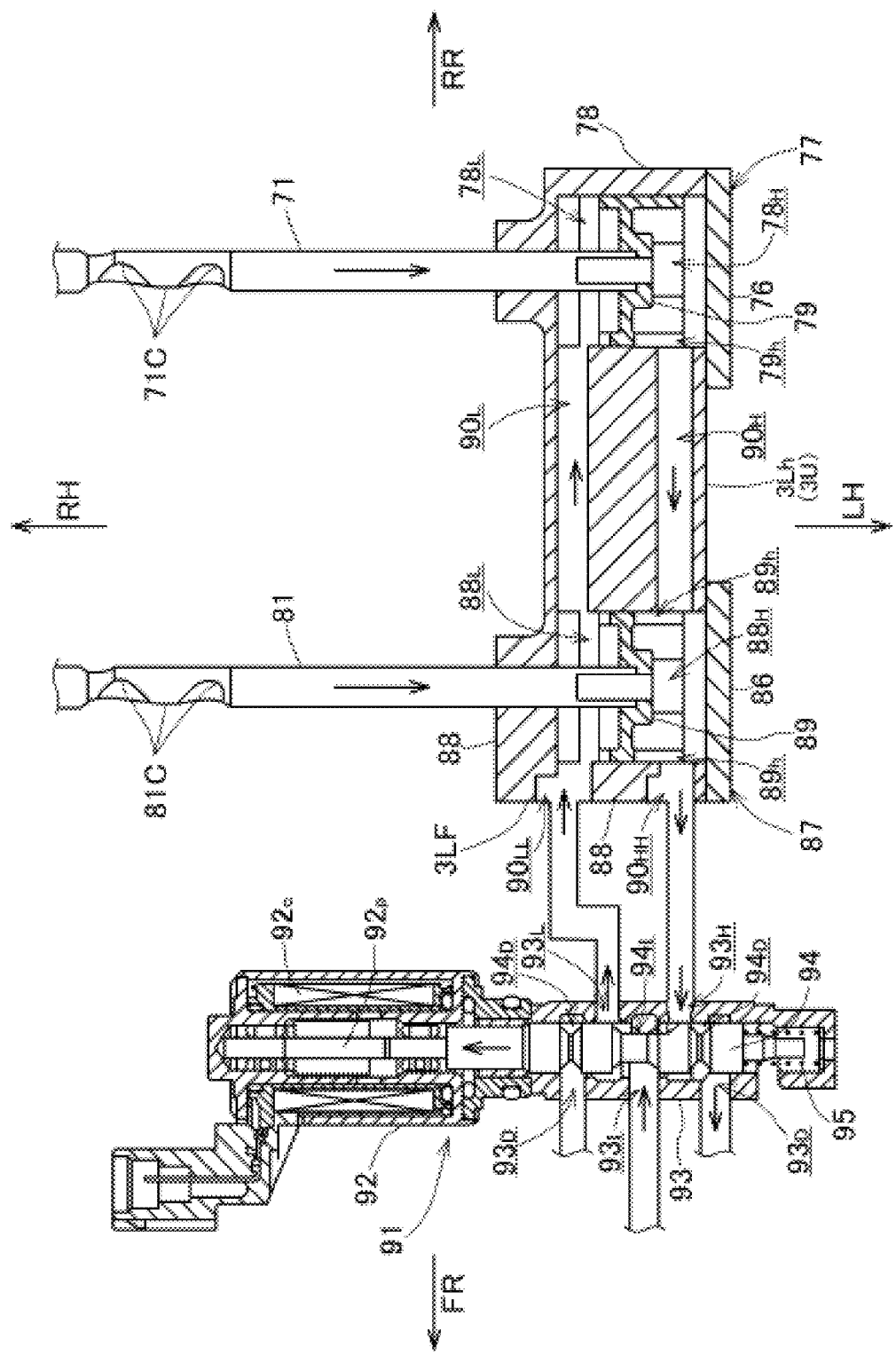
FIG. 8 is an explanatory view showing the hydraulic oil supply and discharge state of an intake-side hydraulic actuator and an exhaust-side hydraulic actuator when a linear solenoid valve is not energized.

A direct-acting cam mechanism Cb is structured in which: the exhaust-side switch drive shaft 81 axially shifting shifts the cam surface 81C (a cam surface which is identical in shape to the cam surface 71C, see FIG. 8) of the long hole 81a; whereby the first switch pin 83 and the second switch pin 84 alternately advance and retract perpendicularly to the axial direction.

As shown in FIG. 5, the exhaust-side switch drive shaft 81 and the first and second switch pins 83, 84 in the cylindrical boss parts 3Bs, 3Bs are disposed so as to at least partially overlap with the extension of the axial direction of the front (exhaust-side) right four stud bolts 7 out of the stud bolts 7 which integrally fasten the crankcase 1 and the cylinder block 2 and the cylinder head 3 stacked on the crankcase 1.

With reference to FIGS. 5 and 6, at the left side wall $3U_L$ of the upper cylinder head 3U, an intake-side hydraulic actuator 77 axially shifting the intake-side switch drive shaft 71 is provided so as to project into the valve chamber 3d. In the valve chamber 3d, an exhaust-side hydraulic actuator 87 which axially shifts the exhaust-side switch drive shaft 81 is provided so as to project while being juxtaposed to the intake-side hydraulic actuator 77 on the front side thereof.

That is, the intake-side hydraulic actuator 77 and the exhaust-side hydraulic actuator 87 are integrated with the upper cylinder head 3U.

As shown in FIG. 5, the intake-side hydraulic actuator 77 and the exhaust-side hydraulic actuator 87 are disposed so as to at least partially overlap with the extension of the axial direction of the leftmost two stud bolts 7, 7 out of the ten stud bolts 7 which integrally fasten the crankcase 1 and the cylinder block 2 and the cylinder head 3 stacked on the crankcase 1.

Figure 9:
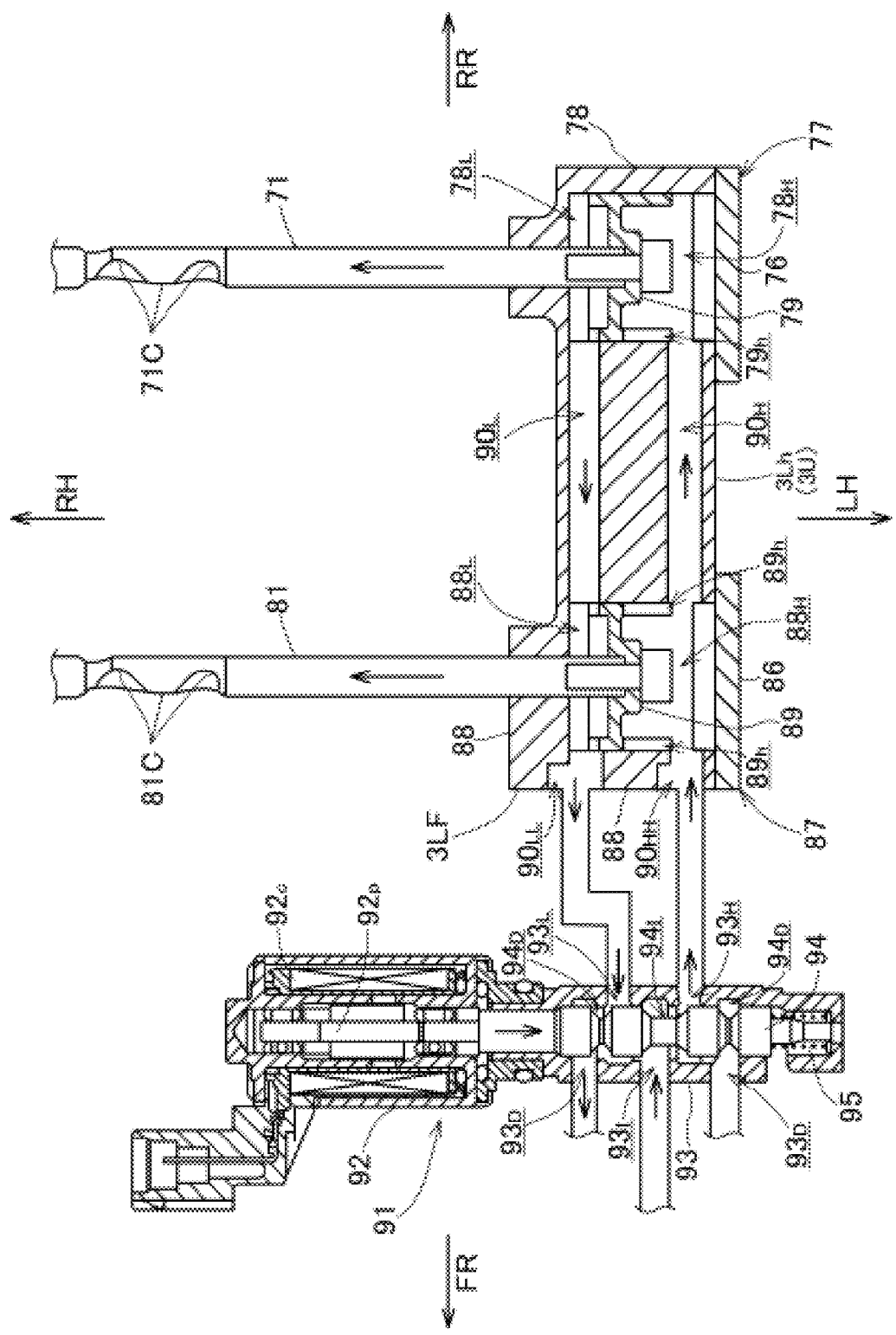
FIG. 9 is an explanatory view showing the hydraulic oil supply and discharge state of the intake-side hydraulic actuator and the exhaust-side hydraulic actuator when the linear solenoid valve is energized.

With reference to FIGS. 8 and 9, the intake-side hydraulic actuator 77 has a bottomed cylindrical intake-side actuator driver 79 fit to a circular bore-like in-housing chamber of the intake-side actuator housing 78 reciprocatively slidably in the axial direction of the intake-side switch drive shaft 71 (the right-left direction). The left end of the intake-side switch drive shaft 71 is fitted to the intake-side actuator driver 79 so that the intake-side switch drive shaft 71 and the intake-side actuator driver 79 integrally shift.

The in-housing chamber of the intake-side actuator housing 78 has its left opening closed by a lid member 76. The intake-side actuator driver 79 divides the in-housing chamber into a left high-speed-side hydraulic chamber $78_H$ and a right low-speed-side hydraulic chamber $78_L$.

Similarly, the exhaust-side hydraulic actuator 87 has a bottomed cylindrical exhaust-side actuator driver 89 fit to a circular bore-like in-housing chamber of the exhaust-side actuator housing 88 reciprocatively in the right-left direction. The left end of the exhaust-side switch drive shaft 81 is fitted to the exhaust-side actuator driver 89 so that the exhaust-side switch drive shaft 81 and the exhaust-side actuator driver 89 integrally shift.

The in-housing chamber of the exhaust-side actuator housing 88 has its left opening closed by a lid member 86. The exhaust-side actuator driver 89 divides the in-housing chamber into a left high-speed-side hydraulic chamber $88_H$ and a right low-speed-side hydraulic chamber $88_L$.

With reference to FIGS. 8 and 9, formed at the left side wall $3U_L$ of the upper cylinder head 3U are: a high-speed-side supply and discharge oil passage $90_H$ which communicates with the high-speed-side hydraulic chamber $78_H$ of the intake-side hydraulic actuator 77 and the high-speed-side hydraulic chamber $88_H$ of the exhaust-side hydraulic actuator 87; and a low-speed-side supply and discharge oil passage $90_L$ which communicates with the low-speed-side hydraulic chamber $78_L$ of the intake-side hydraulic actuator 77 and the low-speed-side hydraulic chamber $88_L$ of the exhaust-side hydraulic actuator 87.

Figure 10:
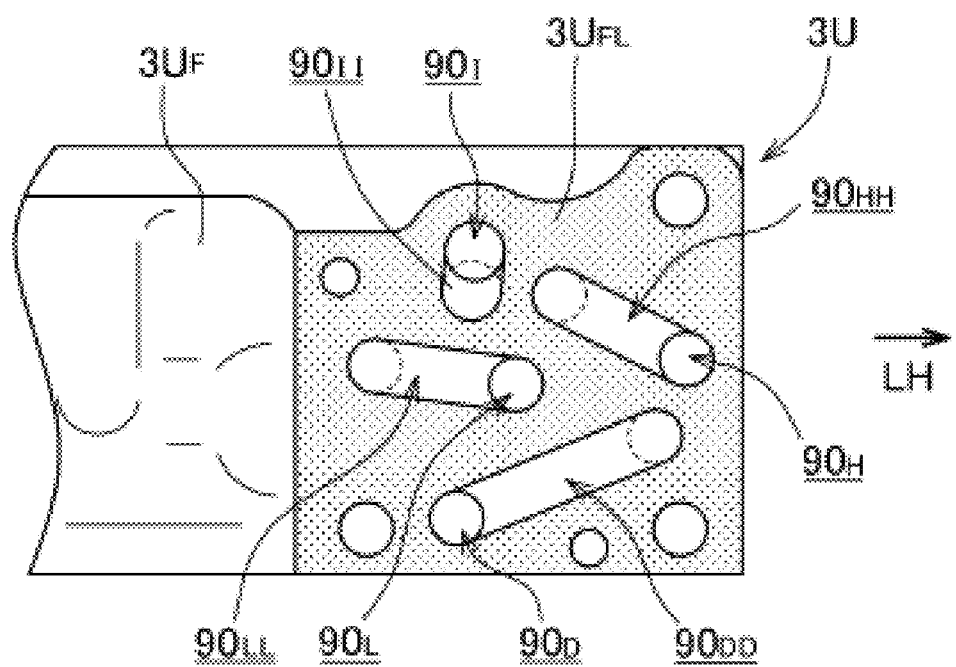
FIG. 10 is a front view showing a left-end matching surface of the front surface of a front side wall of the upper cylinder head.

The high-speed-side supply and discharge oil passage $90_H$ penetrates frontward the high-speed-side hydraulic chamber $88_H$ of the exhaust-side hydraulic actuator 87 and opens at a left-end matching surface $3U_{FL}$ at the left end of the front surface of the front wall $3U_F$ of the upper cylinder head 3U (FIG. 10). The low-speed-side supply and discharge oil passage $90_L$ penetrates frontward the low-speed-side hydraulic chamber $88_L$ of the exhaust-side hydraulic actuator 87 and opens at a left-end matching surface $3U_{FL}$ at the front wall $3U_F$ (FIG. 10).

A cylindrical part of the bottomed cylindrical intake-side actuator driver 79 of the intake-side hydraulic actuator 77 opposing ti the high-speed-side supply and discharge oil passage $90_H$ is provided with a long hole 79h elongated in the axial direction. Therefore, the communication port which opens at the in-housing chamber of the high-speed-side supply and discharge oil passage $90_H$ bored in the intake-side actuator housing 78 constantly opposes to the long hole 79h of the cylindrical part despite shifting of the intake-side actuator driver 79, thereby constantly maintaining the communication between the high-speed-side supply and discharge oil passage $90_H$ and the high-speed-side hydraulic chamber $78_H$.

On the front and rear sides of the cylindrical part of the bottomed cylindrical exhaust-side actuator driver 89 of the exhaust-side hydraulic actuator 87 opposing to the high-speed-side supply and discharge oil passage $90_H$, long holes 89h, 89h elongated in the axial direction are formed. Therefore, the communication port which opens at the in-housing chamber of the high-speed-side supply and discharge oil passage $90_H$ bored in the exhaust-side actuator housing 88 constantly opposes to the long holes 89h, 89h of the cylindrical part despite shifting of the exhaust-side actuator driver 89, thereby constantly maintaining the communication between the high-speed-side supply and discharge oil passage $90_H$ and the high-speed-side hydraulic chamber $88_H$.

Note that, the low-speed-side supply and discharge oil passage $90_L$ constantly communicates with the low-speed-side hydraulic chamber $78_L$ of the intake-side hydraulic actuator 77 and the low-speed-side hydraulic chamber $88_L$ of the exhaust-side hydraulic actuator 87 irrespective of whether the intake-side actuator driver 79 of the intake-side hydraulic actuator 77 and the exhaust-side actuator driver 89 of the exhaust-side hydraulic actuator 87 shift rightward or leftward.

FIG. 10 shows the left-end matching surface $3U_{FL}$ at the front surface of the front wall $3U_F$ of the upper cylinder head 3U. At the left-end matching surface $3U_{FL}$, the high-speed-side supply and discharge oil passage $90_H$ and the low-speed-side supply and discharge oil passage $90_L$ open. Long grooves $90_{HH}$, $90_{LL}$ are formed rightward and slightly obliquely upward from the openings.

On the left-end matching surface $3U_{FL}$ at the front surface of the front wall $3U_F$ of the upper cylinder head 3U, a linear solenoid valve 91 is mounted.

With reference to FIGS. 8 and 9, in the linear solenoid valve 91, a sleeve 93 is provided on the extension of an electromagnetic solenoid 92 including an electromagnetic coil 92c and a plunger 92p shifting in the electromagnetic coil 92c.

A spool valve 94 is slidably inserted into the sleeve 93. By being biased by a spring 95, the spool valve 94 coaxially abuts on the plunger 92p.

The linear solenoid valve 91 is mounted on the left-end matching surface $3U_{FL}$ which is the left end of the front surface of the upper cylinder head 3U, having the spool valve 94, which is coaxial to the plunger 92p of the electromagnetic solenoid 92, oriented in the right-left horizontal direction (see FIGS. 2 and 3).

As shown in FIGS. 8 and 9, the linear solenoid valve 91 shifts in the right-left direction having the spool valve 94 set parallel to the intake-side switch drive shaft 71 and the exhaust-side switch drive shaft 81 and oriented in the right-left direction.

Accordingly, when the electromagnetic coil 92c is energized, the plunger 92p projects leftward (LH) with the spool valve 94 in the sleeve 93, against the biasing force of the spring 95 (see FIG. 9). When the energization of the electromagnetic coil 92c is cancelled, the spool valve 94 retracts rightward (RH) by the biasing force of the spring 95 (see FIG. 8).

The sleeve 93 is provided with a hydraulic pressure supply port $93_I$ positioned at the center, a high-speed-side supply and discharge port $93_H$ and a low-speed-side supply and discharge port $93_L$ positioned on the opposite sides of the hydraulic pressure supply port $93_I$ and a pair of drain ports $93_D$, $93_D$ positioned on the opposite sides of the supply and discharge ports $93_H$, $93_L$.

The spool valve 94 sliding inside the sleeve 93 is provided with a hydraulic pressure supply groove $94_I$ provided at the center, and a pair of drain grooves $94_D$, $94_D$ axially aligned and positioned on the opposite sides of the hydraulic pressure supply groove $94_I$ via lands.

Note that, FIGS. 8 and 9 schematically show the sleeve 93 of the linear solenoid valve 91.

Figure 11:
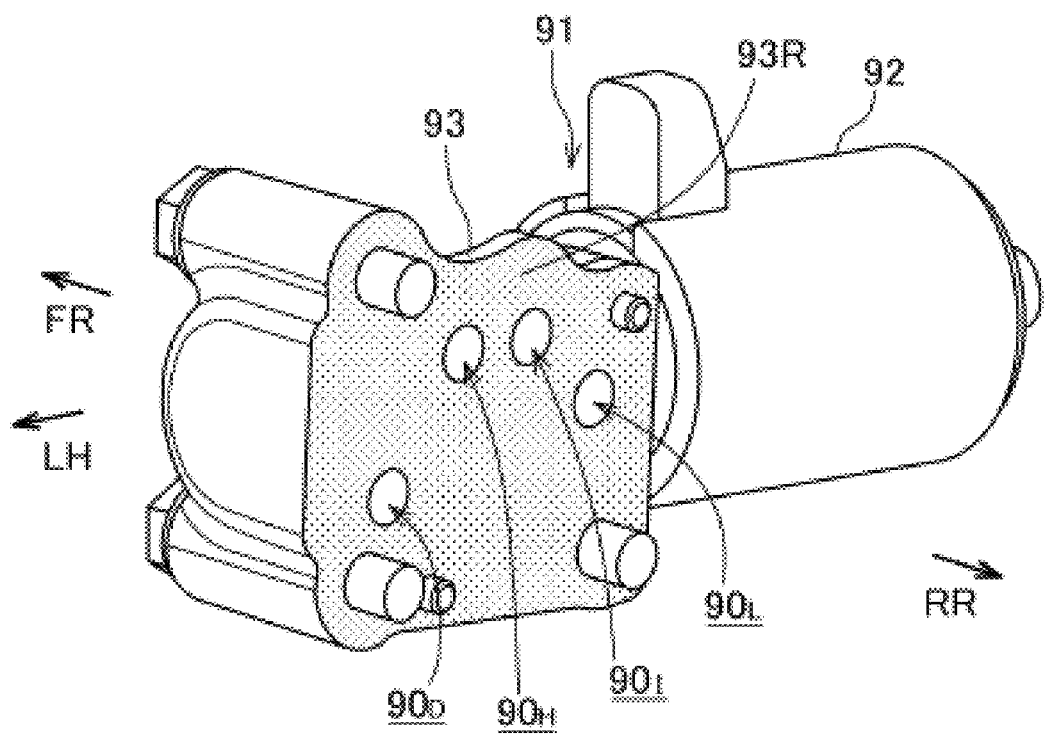
FIG. 11 is a perspective view of the linear solenoid valve.

FIG. 11 shows the actual linear solenoid valve 91. The rear side surface of the sleeve 93 is a matching surface 93R. At the matching surface 93R, the hydraulic pressure supply port $93_I$, the high-speed-side supply and discharge port $93_H$, the low-speed-side supply and discharge port $93_L$, and the drain port $93_D$ open.

This matching surface 93R which is the rear side surface of the sleeve 93 of the linear solenoid valve 91 is matched with the left-end matching surface $3U_{FL}$ of the front surface of the front wall $3U_F$ of the upper cylinder head 3U shown in FIG. 10, whereby the linear solenoid valve 91 is mounted on the upper cylinder head 3U.

Accordingly, at the left-end matching surface $3U_{FL}$ of the front wall $3U_F$ of the upper cylinder head 3U shown in FIG. 10, respectively corresponding to the hydraulic pressure supply port $93_I$ the high-speed-side supply and discharge port $93_H$, the low-speed-side supply and discharge port $93_L$, and the drain port $93_D$ of the sleeve 93, a long groove $90_{II}$ of a hydraulic pressure supply passage $90_I$ the long groove $90_{HH}$ of the high-speed-side supply and discharge oil passage $90_H$, the long groove $90_{LL}$ of the low-speed-side supply and discharge oil passage $90_L$, and a long groove $90_{HD}$ of a drain oil passage $90_D$ open.

In the state shown in FIG. 8, the electromagnetic solenoid 92 of the linear solenoid valve 91 is not energized and the spool valve 94 retracts rightward (RH) by the biasing force of the spring 95. Therefore, hydraulic oil having flowed into the hydraulic pressure supply port $93_I$ of the sleeve 93 from the hydraulic pressure supply passage $90_1$ via the long groove $90_{II}$ flows from the low-speed-side supply and discharge port $93_L$ via the hydraulic pressure supply groove $94_I$ into the low-speed-side supply and discharge oil passage $90_L$ of the long groove $90_{LL}$ at the left side wall $3U_L$ of the upper cylinder head 3U, and supplied to the low-speed-side hydraulic chamber $88_L$ of the exhaust-side hydraulic actuator 87 and therefrom to the low-speed-side hydraulic chamber $78_L$ of the intake-side hydraulic actuator 77. Thus, the intake-side actuator driver 79 of the intake-side hydraulic actuator 77 and the exhaust-side actuator driver 89 of the exhaust-side hydraulic actuator 87 are pushed and shift leftward (LH).

Since the actuator drivers 79, 89 of the intake-side hydraulic actuator 77 and the exhaust-side hydraulic actuator 87 shift leftward, hydraulic oil flows from the high-speed-side hydraulic chambers $78_H$, $88_H$ of the intake-side hydraulic actuator 77 and the exhaust-side hydraulic actuator 87 to the high-speed-side supply and discharge oil passage $90_H$. The hydraulic oil further flows from the high-speed-side supply and discharge oil passage $90_H$, via the long groove $90_{HH}$, to the high-speed-side supply and discharge port $93_H$ of the sleeve 93 of the linear solenoid valve 91, and discharged from the drain port $93_D$ via the drain groove $94_D$ to the drain oil passage $90_D$ via the long groove $90_{DD}$.

In this manner, when the electromagnetic solenoid 92 of the linear solenoid valve 91 is not energized, as shown in FIG. 8, hydraulic oil is supplied to the low-speed-side hydraulic chambers $78_L$, $88_L$ of the intake-side hydraulic actuator 77 and the exhaust-side hydraulic actuator 87, and the hydraulic oil flows out from the high-speed-side hydraulic chambers $78_H$, $88_H$, whereby the actuator drivers 79, 89 of the intake-side hydraulic actuator 77 and the exhaust-side hydraulic actuator 87 simultaneously shift leftward (LH). Therefore, the intake-side switch drive shaft 71 and the exhaust-side switch drive shaft 81 respectively integrally fitted to the actuator drivers 79, 89 also simultaneously shift leftward (LH).

When the electromagnetic solenoid 92 of the linear solenoid valve 91 is energized, as shown in FIG. 9, the spool valve 94 projects leftward (LH) against the biasing force of the spring 95, and hydraulic oil having flowed into the hydraulic pressure supply port $93_1$ of the sleeve 93 flows from the high-speed-side supply and discharge port $93_H$ via the hydraulic pressure supply groove $94_1$ into the high-speed-side supply and discharge oil passage $90_H$ at the left side wall $3U_L$ of the upper cylinder head 3U via the long groove $90_{HH}$, and supplied to the high-speed-side hydraulic chamber $88_H$ of the exhaust-side hydraulic actuator 87 and therefrom to the high-speed-side hydraulic chamber $78_H$ of the intake-side hydraulic actuator 77. Thus, the intake-side actuator driver 79 of the intake-side hydraulic actuator 77 and the exhaust-side actuator driver 89 of the exhaust-side hydraulic actuator 87 are pushed rightward (RH) and shift.

Note that, from the low-speed-side hydraulic chambers $78_L$, $88_L$ of the intake-side hydraulic actuator 77 and the exhaust-side hydraulic actuator 87, hydraulic oil flows out to the low-speed-side supply and discharge oil passage $90_L$. The hydraulic oil further flows out from the low-speed-side supply and discharge oil passage $90_L$ via the long groove $90_{LL}$ to the low-speed-side supply and discharge port $93_L$ of the electromagnetic solenoid valve 92 of the linear solenoid valve 91, and discharged from the drain port $93_D$ via the drain groove $94_D$ to the drain oil passage $90_D$.

In this manner, when the electromagnetic solenoid 92 of the linear solenoid valve 91 is energized, as shown in FIG. 9, hydraulic oil is supplied to the high-speed-side hydraulic chambers $78_H$, $88_H$ of the intake-side hydraulic actuator 77 and the exhaust-side hydraulic actuator 87, and the hydraulic oil flows out from the low-speed-side hydraulic chambers $78_L$, $88_L$, whereby the actuator drivers 79, 89 of the intake-side hydraulic actuator 77 and the exhaust-side hydraulic actuator 87 simultaneously shift rightward. Therefore, the intake-side switch drive shaft 71 and the exhaust-side switch drive shaft 81 respectively integrally fitted to the actuator drivers 79, 89 also simultaneously shift rightward (RH).

As described above, when the electromagnetic solenoid 92 of the linear solenoid valve 91 is not energized and the intake-side switch drive shaft 71 and the exhaust-side switch drive shaft 81 shift leftward (LH), in the intake-side cam switch mechanism 70 shown in FIG. 12, the first switch pin 73 of each direct-acting cam mechanism Ca is at the advanced position abutting on the recessed curved surface 71Cv of the intake-side switch drive shaft 71, while the second switch pin 74 is at the retracted position abutting on the flat surface 71Cp in the cam surface 71C.

The advanced first switch pin 73 engages with the annular lead groove 44c of the lead groove cylindrical part 43D of corresponding intake-side cam carrier 43 shifted rightward. The intake-side cam carrier 43 does not axially shift and maintained at a right-side predetermined position.

When each intake-side cam carrier 43 is at a right-side predetermined position (the low-speed-side position), as shown in FIG. 12, the low-speed-side cam lobe 43B acts on the intake rocker arm 72, and the intake valve 41 operates in accordance with the low-speed-side valve actuation characteristic set on the cam profile of the low-speed-side cam lobe 43B.

That is, the engine E is in the low-speed drive state.

Figure 13:
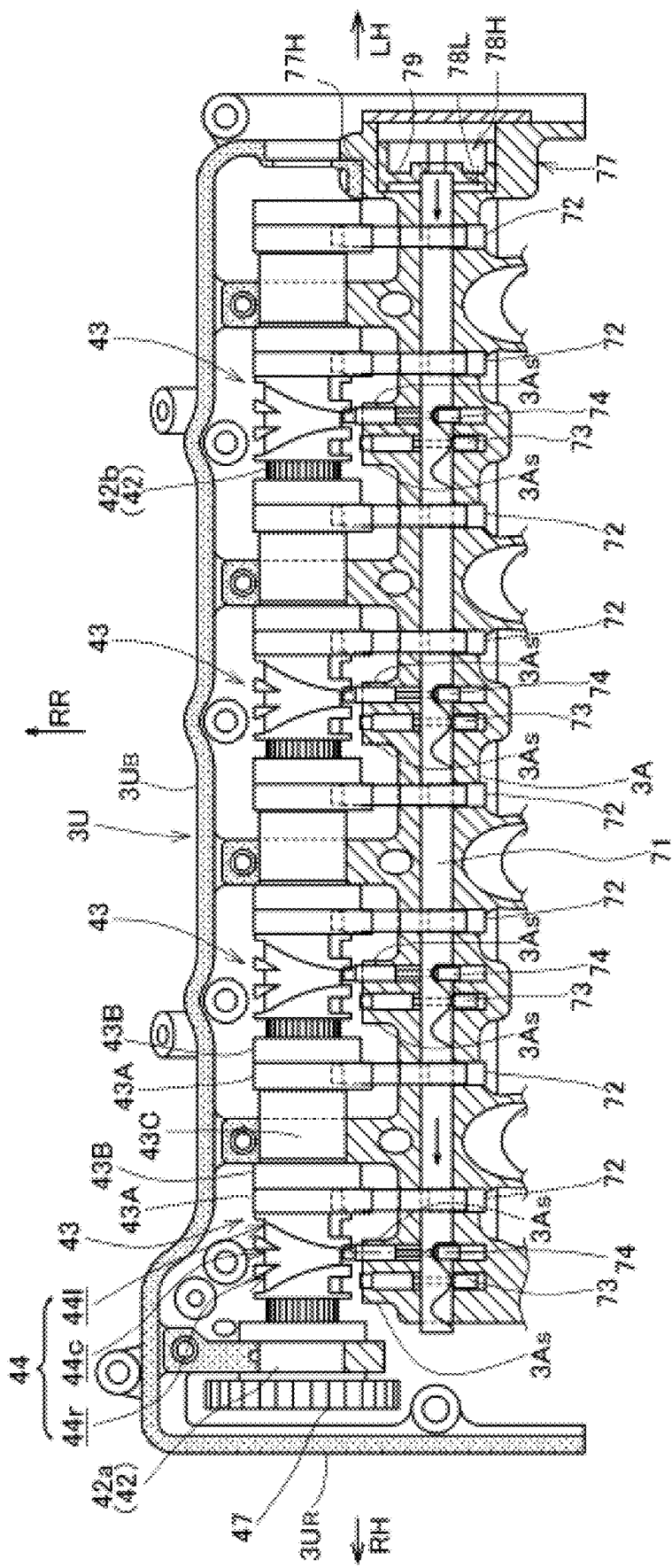
FIG. 13 is an explanatory view showing the operation state of main members of the intake-side cam switch mechanism in a high-speed drive mode of the engine.

From this state, when the electromagnetic solenoid 92 of the linear solenoid valve 91 is energized and the intake-side switch drive shaft 71 shifts rightward, with reference to FIG. 13, the truncated cone end surface 73bt of the first switch pin 73 ascends the slope of the recessed curved surface 71Cv from the center of the recessed curved surface 71Cv thereby retracted, to abut on the flat surface 71Cp. The truncated cone end surface 74bt of the second switch pin 74 descends the slope of the recessed curved surface 71Cv from the flat surface 71Cp thereby advancing, to abut on the center of the recessed curved surface 71Cv.

Accordingly, the retracted first switch pin 73 disengages from the annular lead groove 44c of the intake-side cam carrier 43, and the advanced second switch pin 74 engages with the left shift lead groove 44l. Therefore, the intake-side cam carrier 43 shifts axially leftward while rotating as being guided by the left shift lead groove 44l and, as shown in FIG. 13, the second switch pin 74 shifts from the left shift lead groove 44l to the annular lead groove 44c to engage therewith, while the intake-side cam carrier 43 is maintained at a left-side predetermined position.

When each intake-side cam carrier 43 is at the left-side predetermined position (the high-speed-side position), as shown in FIG. 13, the high-speed-side cam lobe 43A acts on the intake rocker arm 72, and the intake valve 41 operates in accordance with the high-speed-side valve actuation characteristic set on the cam profile of the high-speed-side cam lobe 43A.

That is, the engine E is in the high-speed drive state.

From this high-speed drive state, when the intake-side switch drive shaft 71 shifts leftward, the second switch pin 74 retracts and disengages with the annular lead groove 44c, while the first switch pin 73 advances and engages with the right shift lead groove 44r. Therefore, the intake-side cam carrier 43 shifts axially rightward while rotating as being guided by the right shift lead groove 44r and, as shown in FIG. 12, the low-speed drive state is entered where the intake-side cam carrier 43 is maintained at a right-side predetermined position (the low-speed-side position) and the low-speed-side cam lobe 43B acts on the intake rocker arm 72.

Similarly to the operation of the intake-side cam switch mechanism 70 by shifting of the intake-side switch drive shaft 71 corresponding to energization and cancelling the energization of the electromagnetic solenoid 92 of the linear solenoid valve 91 described above, the exhaust-side cam switch mechanism 80 similarly operates by shifting of the exhaust-side switch drive shaft 81.

The variable valve gear 40 includes an intake-side limit switch 35 that detects whether the intake-side switch drive shaft 71 shifting in the right-left axial direction is at a left-side predetermined position (the high-speed-side position) or a right-side predetermined position (the low-speed-side position), and an exhaust-side limit switch 36 that detects whether the exhaust-side switch drive shaft 81 shifting in the right-left axial direction is at a left-side predetermined position (the high-speed-side position) or a right-side predetermined position (the low-speed-side position).

Figure 14:
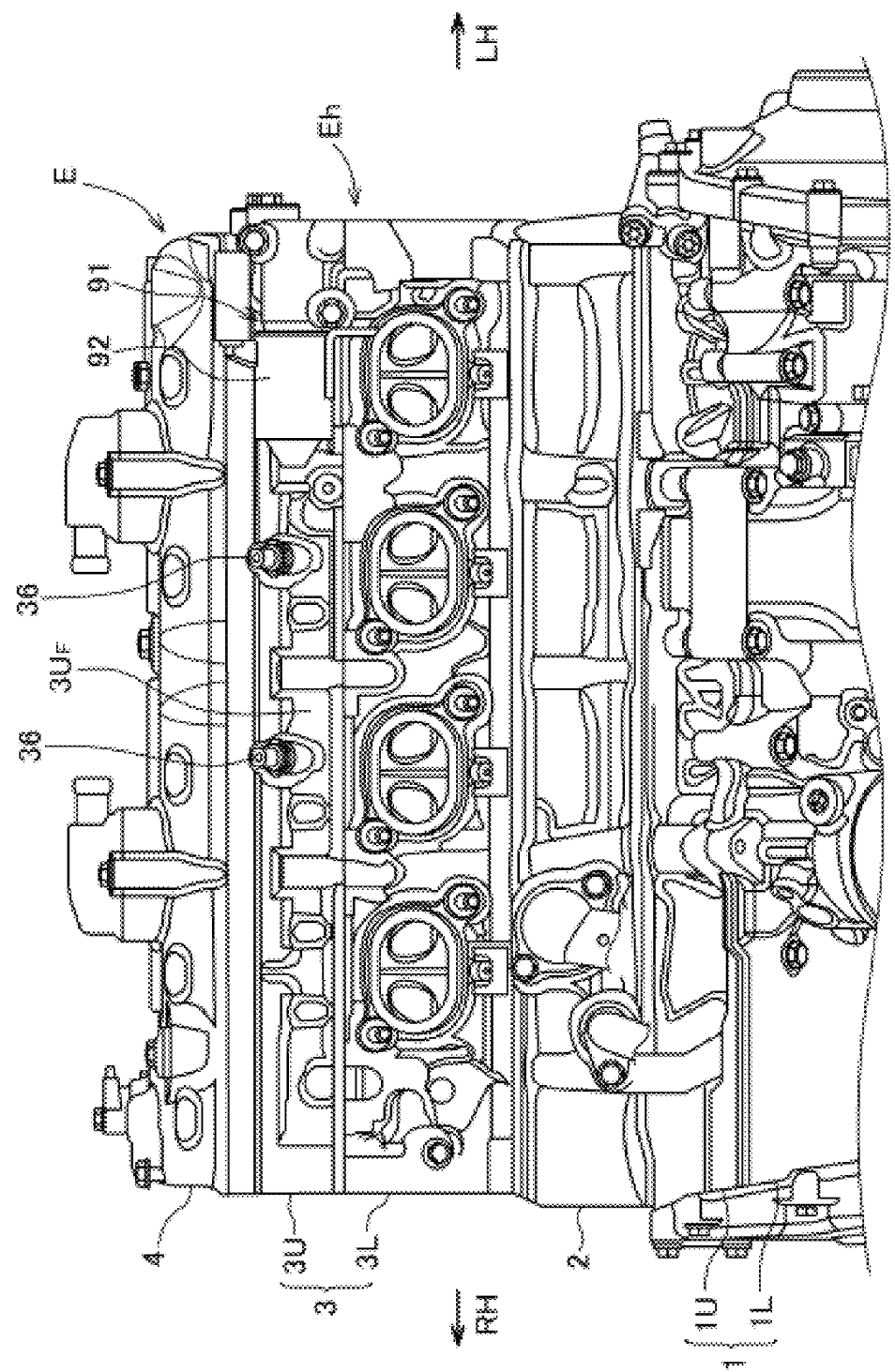
FIG. 14 is a front view of an engine body of the engine.

FIG. 14 is a front view of the engine body Eh formed of: the crankcase 1; the cylinder block 2 having four cylinders arranged in line, the lower cylinder head 3L, and the upper cylinder head 3U successively stacked on and fastened with the crankcase 1; and the cylinder head cover 4 covering the upper cylinder head 3U.

Figure 15:
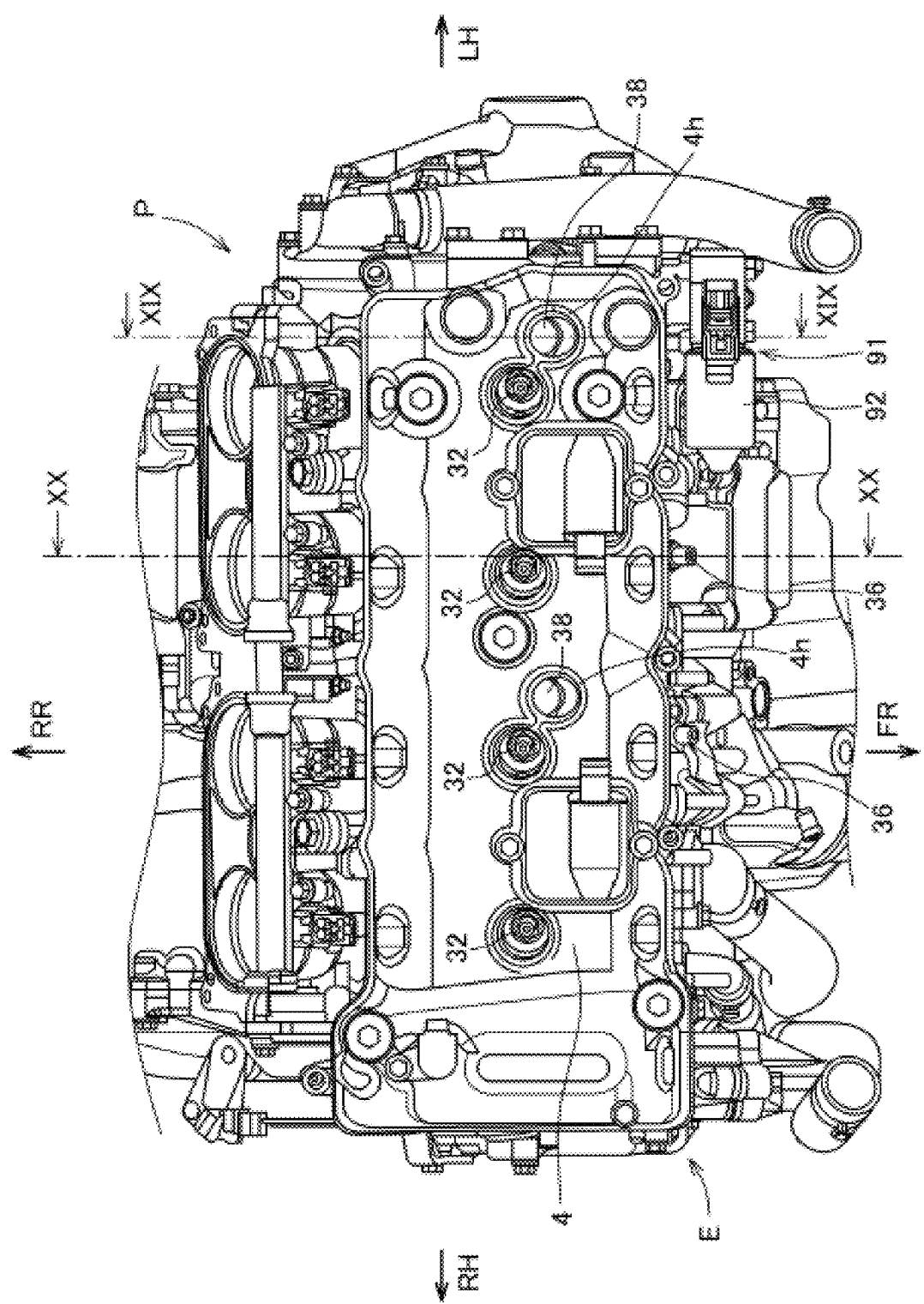
FIG. 15 is a top view of the engine body.
Figure 16:
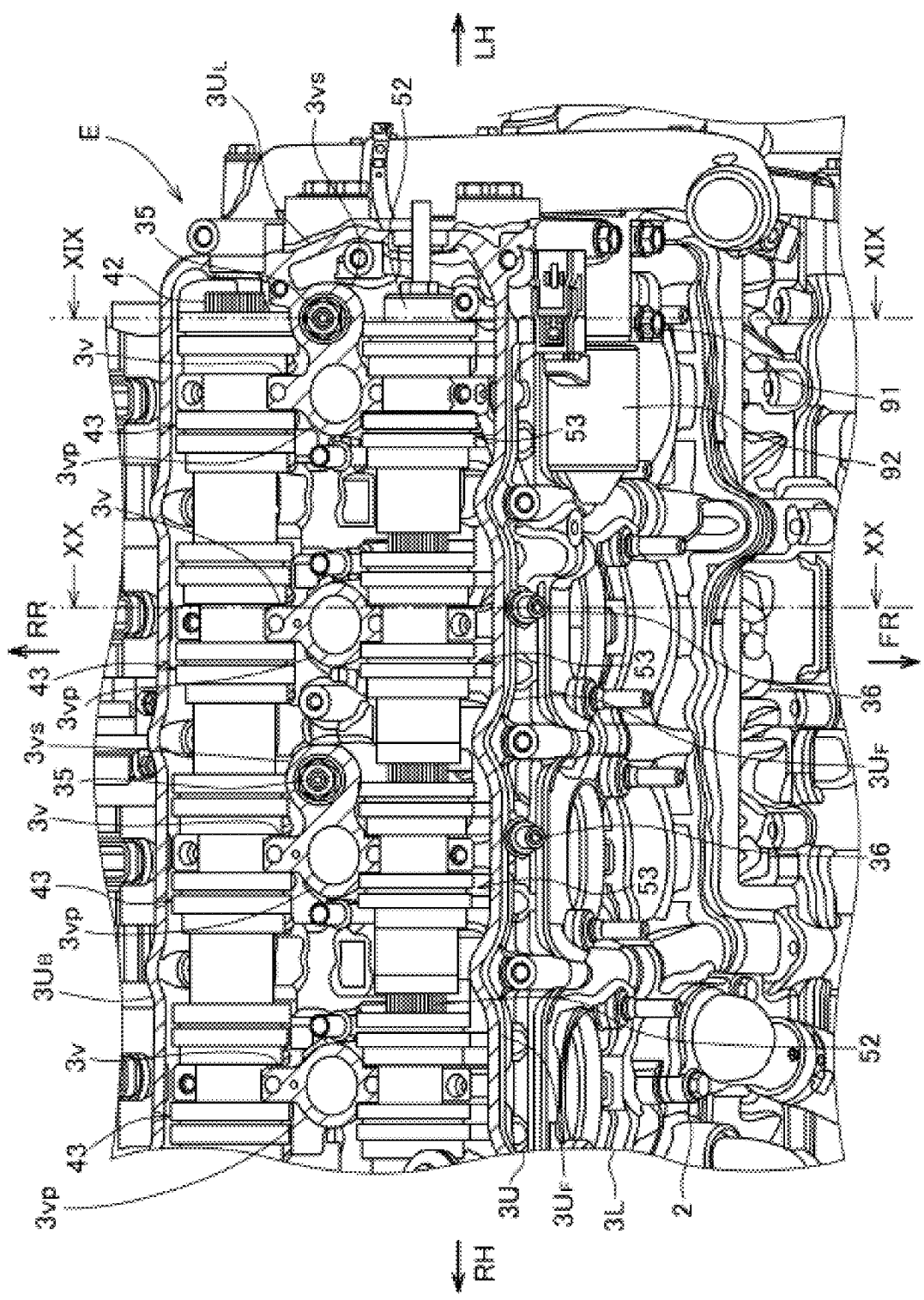
FIG. 16 is a top view of the engine body without the cylinder head cover.
Figure 17:
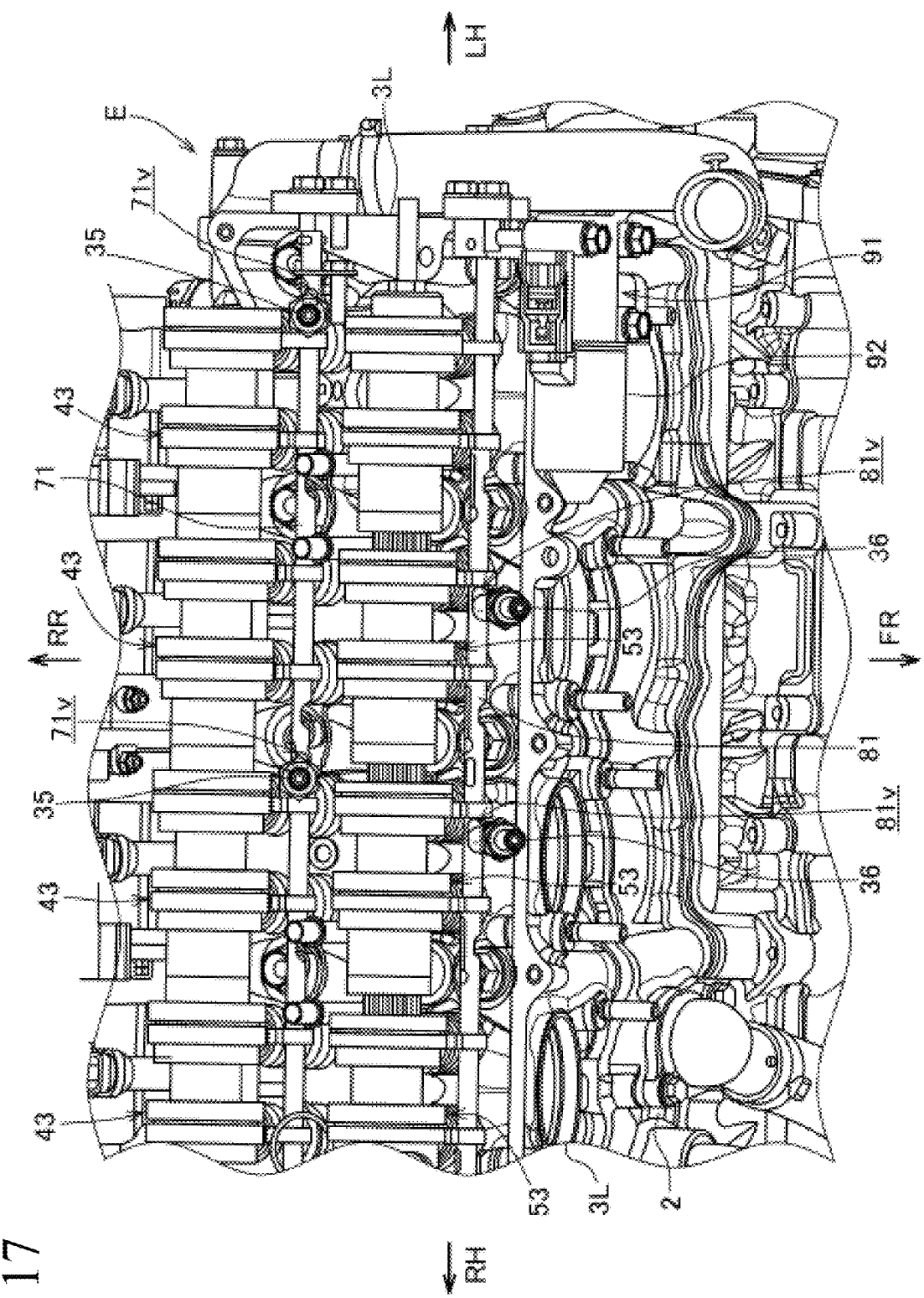
FIG. 17 is a top view of the engine body without the cylinder head cover and in which the upper cylinder head is not shown.
Figure 18:
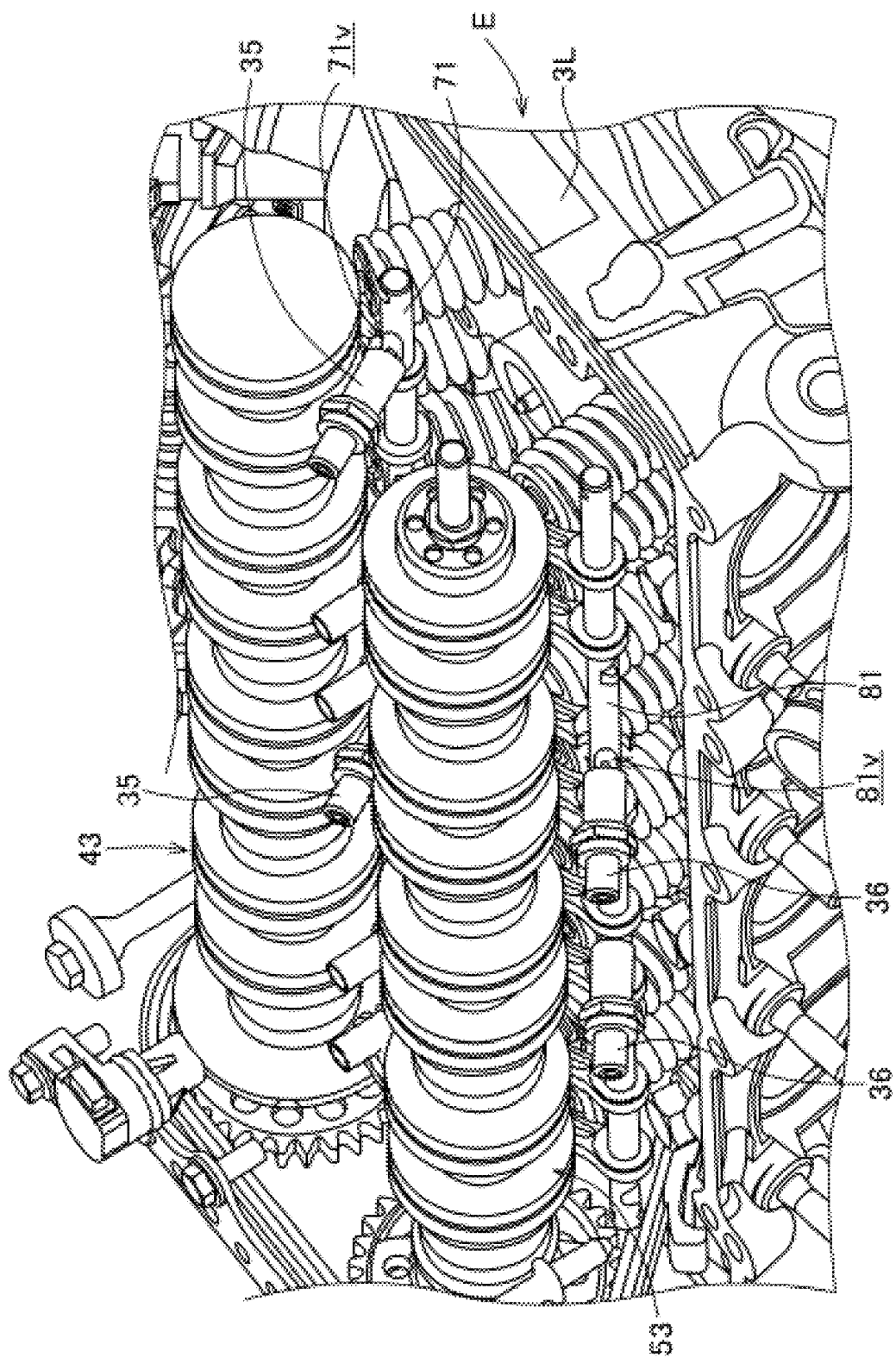
FIG. 18 is a perspective view of the engine body without the cylinder head cover and in which the upper cylinder head is not shown.

FIG. 15 is a top view of the engine body Eh. FIG. 16 is a top view of the engine body Eh without the cylinder head cover 4. FIG. 17 is a top view of the engine body Eh without the cylinder head cover 4 and not showing the upper cylinder head 3U. FIG. 18 is a perspective view of the engine body Eh without the cylinder head cover 4 and not showing the upper cylinder head 3U.

The exhaust-side switch drive shaft 81 penetrates in the right-left direction around the front wall $3U_F$ of the upper cylinder head 3U and is axially slidably supported.

The exhaust-side limit switch 36 which detects the shifting of the exhaust-side switch drive shaft 81 is mounted on the front wall $3U_F$ of the upper cylinder head 3U.

Figure 20:
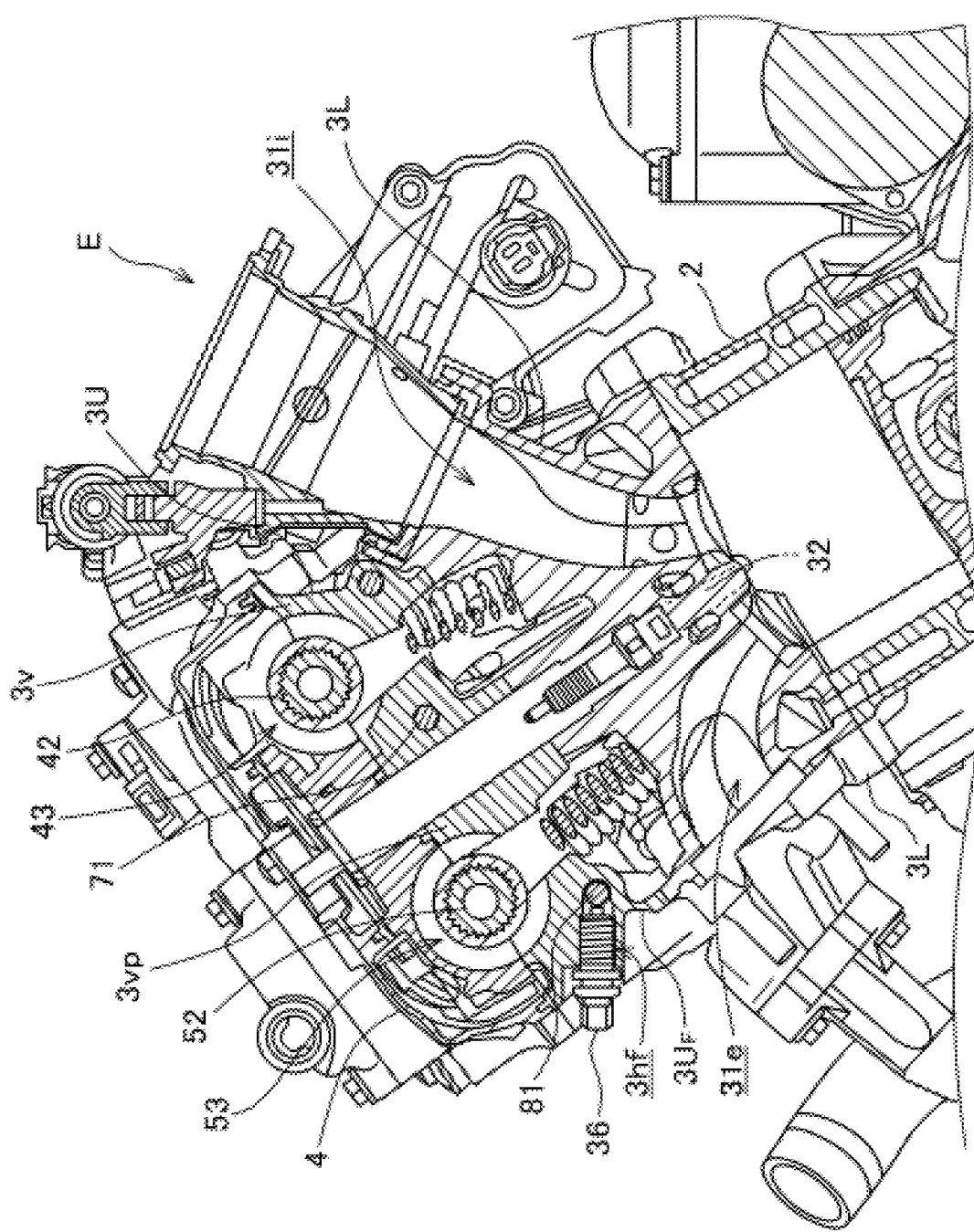
FIG. 20 is a partial cross-sectional view of the engine body taken along line XX-XX in FIGS. 15 and 16.

As shown in FIG. 20, at the front wall $3U_F$ of the upper cylinder head 3U, a sensor mounting hole 3*hf* is bored from a front obliquely upper position toward the exhaust-side switch drive shaft 81.

Along the inner circumferential surface of the sensor mounting hole 36*hf*, a female screw thread is cut.

Into the sensor mounting hole 36*hf*, the exhaust-side limit switch 36 is screwed from the front obliquely upper position and mounted thereon.

With reference to FIGS. 17, 18, and 20, the exhaust-side limit switch 36 has its detecting pin 36*p* projected from its tip by being biased by a spring. The detecting pin 36*p* is pressed against the exhaust-side switch drive shaft 81.

At a predetermined portion of the exhaust-side switch drive shaft 81, a recess 81*v* is formed at the surface oriented to the exhaust-side limit switch 36. When the exhaust-side switch drive shaft 81 is at a right-side predetermined position (the low-speed-side position), the detecting pin 36*p* projectively advances into the recess 81*v* to turn off the exhaust-side limit switch 36. When the exhaust-side switch drive shaft 81 is at a left-side predetermined position (the high-speed-side position), the detecting pin 36*p* brought into contact with the outer circumferential surface of the exhaust-side switch drive shaft 81 retracts, to turn on the exhaust-side limit switch 36.

Accordingly, the exhaust-side limit switch 36 is capable of detecting whether the exhaust-side switch drive shaft 81 is at a left-side predetermined position (the high-speed-side position) or a right-side predetermined position (the low-speed-side position).

The exhaust-side limit switch 36 is provided on each of the right and left sides, that is, by two pieces in total, in an identical structure at the front wall $3U_F$ of the upper cylinder head 3U.

Figure 19:
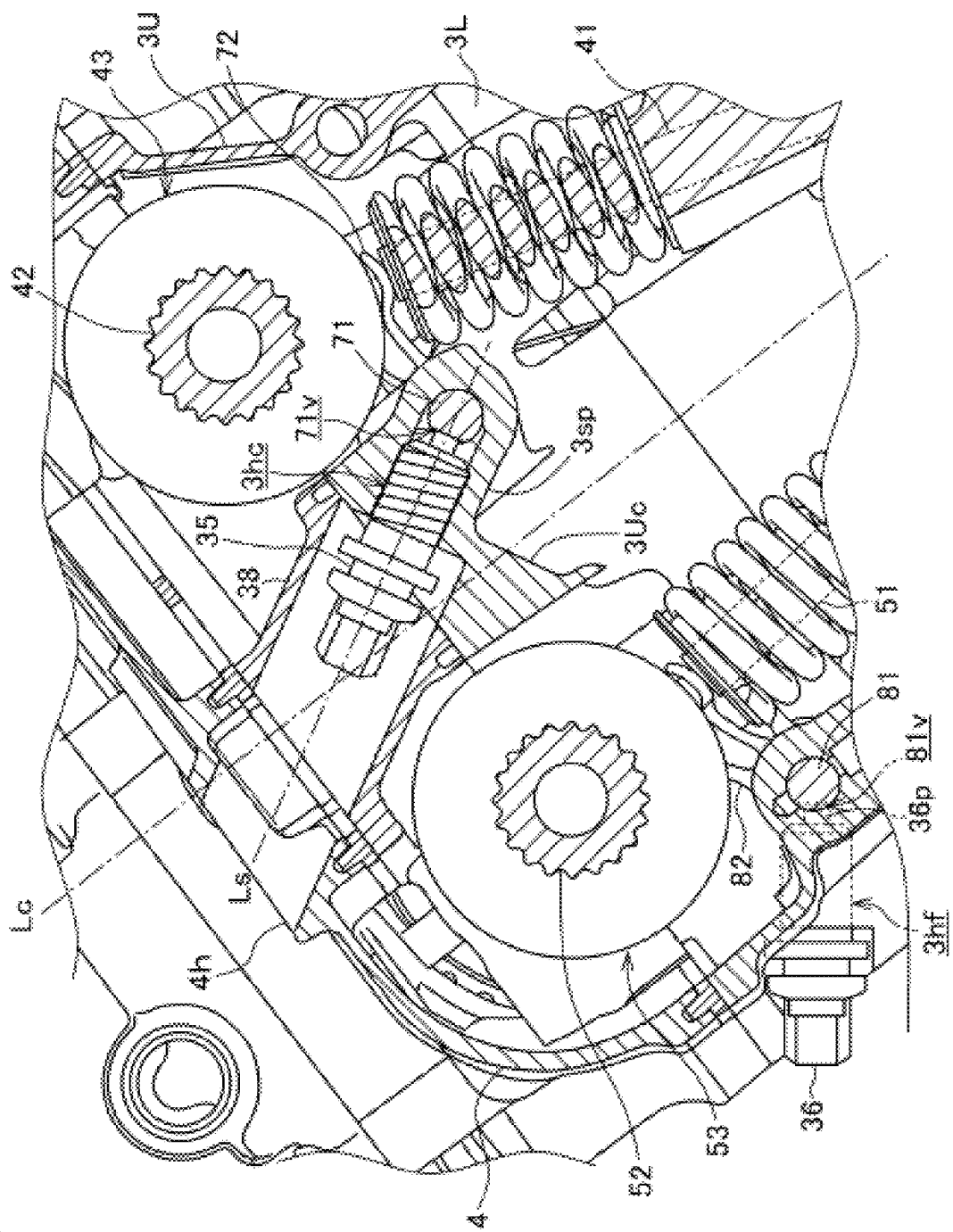
FIG. 19 is a partial cross-sectional view of the engine body taken along line XIX-XIX in FIGS. 15 and 16.

With reference to FIG. 6 and FIG. 19 and others, the intake-side switch drive shaft 71 is axially slidably supported penetrating through the upper cylinder head 3U, toward the intake-side camshaft 42 and at the head inner wall $3U_C$ covered with the cylinder head cover 4 between the intake-side camshaft 42 and the exhaust-side camshaft 52 at the upper cylinder head 3U.

With reference to FIG. 16, formed at the head inner wall $3U_C$ of the upper cylinder head 3U are plug insertion pipes 3*vp* through which spark plugs 32 are inserted into the bearing walls 3*v* formed respectively for the cylinders. Among them, at the leftmost bearing wall 3*v* and the third bearing wall 3*v* from the left, sensor insertion pipes 3*sp*, 3*sp* bulging leftward are integrally formed.

With reference to FIG. 19, each sensor insertion pipe 3*sp* is positioned between the intake-side camshaft 42 and the exhaust-side camshaft 52. The pipe central axis Ls of the sensor insertion pipe 3*sp* is inclined by a certain angle relative to the cylinder axis Lc. The intake-side switch drive shaft 71 is positioned at the bottom part of the sensor insertion pipe 3*sp*, and the pipe central axis Ls is perpendicular to the intake-side switch drive shaft 71.

Along the inner circumferential surface of the sensor insertion pipe 3*sp* at the head inner wall $3U_C$, a female screw thread is cut, to provide a sensor mounting hole 3*hc*. Into the sensor mounting hole 3*hc*, the intake-side limit switch 35 is screwed and mounted thereon.

With reference to FIGS. 18 and 19, the intake-side limit switch 35 has its detecting pin 35*p* projected from its tip by being biased by a spring. The detecting pin 35*p* is pressed against the intake-side switch drive shaft 71.

At a predetermined portion of the intake-side switch drive shaft 71, a recess 71*v* is formed at the surface oriented to the intake-side limit switch 35. When the intake-side switch drive shaft 71 is at a right-side predetermined position (the low-speed-side position), the detecting pin 35*p* projectively advances into the recess 71*v*, to turn off the intake-side limit switch 35. When the intake-side switch drive shaft 71 is at a left-side predetermined position (the high-speed-side position), the detecting pin 35*p* brought into contact with the outer circumferential surface of the intake-side switch drive shaft 71 retracts, to turn on the intake-side limit switch 35.

Accordingly, the intake-side limit switch 35 is capable of detecting whether the intake-side switch drive shaft 71 is at a left-side predetermined position (the high-speed-side position) or a right-side predetermined position (the low-speed-side position).

At the head inner walls $3U_C$, $3U_C$ respectively including the right and left bearing walls 3*v*, 3*v* of the upper cylinder head 3U covered with the cylinder head cover 4, the sensor mounting holes 3*hc*, 3*hc* are respectively formed. On the sensor mounting holes 3*hc*, 3*hc*, the intake-side limit switches 35, 35 are respectively mounted.

The two intake-side limit switches 35, 35 disposed on the right and left sides respectively detect right and left recesses 71*v*, 71*v* formed at the intake-side switch drive shaft 71, to detect the shifting position of the intake-side switch drive shaft 71.

As shown in FIG. 16, the intake-side limit switch 35 is disposed between the intake-side camshaft 42 and the exhaust-side camshaft 52.

As shown in FIG. 16, the right intake-side limit switch 35 is disposed between the second and third spark plugs 32, 32 from the left.

With reference to FIG. 19, between the cylinder head cover 4 and the head inner wall $3U_C$ of the upper cylinder head 3U, a tubular member 38 is interposed.

The tube central axis of the tubular member 38 coincides with the pipe central axis Ls of the sensor insertion pipe 3*sp*, and inclined by a certain angle relative to the cylinder axis Lc.

The tubular member 38 has its upper opening matched with an opening 4*h* formed at the upper wall of the cylinder head cover 4 and opened to the outside of the cylinder head cover 4. The tubular member 38 has its lower opening opposed to the sensor mounting hole 3*hc*.

Accordingly, as shown in FIG. 15, despite the state where the cylinder head cover 4 covers the upper cylinder head 3U, the intake-side limit switch 35 can be inserted into the tubular member 38 from the opening 4*h* at the upper wall of the cylinder head cover 4, so that the intake-side limit switch 35 is screwed into the sensor mounting hole 3*hc* of the sensor insertion pipe 3*sp* to be mounted thereon.

The embodiment of the sensor mounting structure for an engine of the present invention described above in detail exhibits the following effects.

As shown in FIG. 5, since the intake-side limit switch 35 which detects shifting of the intake-side switch drive shaft 71 of the variable valve gear 40 is mounted on the sensor mounting hole 3*hc* formed at the head inner wall $3U_C$ of the cylinder head 3 covered with the cylinder head cover 4, shifting of the intake-side switch drive shaft 71 of the variable valve gear 40 slidably supported at the head inner wall $3U_C$ of the cylinder head 3 covered with the cylinder head cover 4 is detected with ease.

As shown in FIG. 19, the tubular member 38 is interposed between the cylinder head cover 4 and the head inner wall $3U_C$. The tubular member 38 has its one end opening opened to the outside of the cylinder head cover 4, and has its other end opening opposed to the sensor mounting hole 3hc. Using the tubular member 38, the intake-side limit switch 35 is inserted from the one end opening of the tubular member 38, to thereby be mounted on the sensor mounting hole 3hc to which the other end opening opposes. Thus, the sensor mounting work is facilitated.

Additionally, the tubular member 38 covering the intake-side limit switch 35 protects the intake-side limit switch 35 against any external forces.

Note that, the tubular member 38 may be integrally formed with the cylinder head cover 4. The tubular member 38 formed integrally with the cylinder head cover 4 reduces the number of components, and simplifies the assembling work.

The tubular member 38 may be integrally formed with the camshaft holder which rotatably pivotally supports the intake-side camshaft 42 and the exhaust-side camshaft 52 in cooperation with the bearing walls 3v.

Additionally, the camshaft holder integrally including the tubular member 38 may be formed integrally with the cylinder head cover 4.

As shown in FIG. 19, the tube central axis Ls of the tubular member 38 is inclined by a certain angle relative to the cylinder axis Lc. Therefore, in the cylinder head cover 4 whose width in the cylinder axis Lc direction is limited and which forms narrow space, the tubular member 38 is provided with a greater length when disposed inclined relative to the cylinder axis Lc than when disposed parallel to the cylinder axis Lc. This minimizes the risk of the intake-side limit switch 35 projecting from the tubular member 38.

As shown in FIG. 16, in the inline-four engine E, the spark plugs 32 are mounted on the cylinder head 3 respectively for the cylinders, and each intake-side limit switch 35 is disposed between adjacent two spark plugs 32, 32. Thus, the space between the adjacent two spark plugs 32, 32 is effectively used in disposing the intake-side limit switches 35 in a compact manner, contributing to downsizing the engine E.

As shown in FIGS. 17 to 19, between the intake-side camshaft 42 and the exhaust-side camshaft 52 parallel to each other and rotatably pivotally supported at the cylinder head 3, the intake-side limit switches 35 are disposed. Thus, the space between the two camshafts 42, 52 is effectively used in disposing the intake-side limit switches 35 in a compact manner, contributing to downsizing the engine.

As shown in FIGS. 17 and 18, the two intake-side limit switches 35, 35 detect the shift position of the intake-side switch drive shaft 71 by respectively detecting the right and left recesses 71v, 71v formed at the intake-side switch drive shaft 71. Therefore, when one intake-side limit switch 35 fails, other intake-side limit switch 35 detects shifting of the intake-side switch drive shaft 71. Thus, improved reliability is provided.

As shown in FIGS. 17 and 18, the exhaust-side limit switches 36 detecting shifting of the exhaust-side switch drive shaft 81 are also provided by two in number on right and left sides. Therefore, when one exhaust-side limit switch 36 fails, other exhaust-side limit switch 36 detects shifting of the exhaust-side switch drive shaft 81.

Note that, while it has been described that the limit switches 35, 36 detect the recesses of the switch drive shafts 71, 81, the limit switches 35, 36 may detect projections.

In the foregoing, the description has been given of the sensor mounting structure for an engine according to one embodiment of the present invention. The mode of the present invention is not limited to the above-described embodiment, and the present invention may be practiced in various modes within the spirit of the present invention.

While the valve gear according to the above-described embodiment is a variable valve gear in which shifting of a switch drive shaft of the variable valve gear is detected by a sensor, what is detected is not limited to the operation of the switch drive shaft and the operations of other actuation member of the valve gear may be detected.

Furthermore, the sensor is not limited to a limit switch and other sensor may be used.

REFERENCE SIGNS LIST

Pu: power unit
E: engine
M: transmission
1: crankcase
1L: lower crankcase
$1L_F$: front wall
1U: upper crankcase
$1U_F$: front wall
$1U_L$: left side wall
2: cylinder block
$2_F$: front wall
$2_L$: left side wall
3: cylinder head
3L: lower cylinder head
$3L_F$: front wall
3U: upper cylinder head
$3U_F$: front wall
$3U_B$: rear wall
$3U_L$: left side wall
$3U_C$: head inner wall
3sp: sensor insertion pipe
3hc: sensor mounting hole
$3U_{FL}$: left-end matching surface
3v: bearing wall
3c: cam chain chamber
4: cylinder head cover
5: oil pan
7: stud bolt
10: crankshaft
11: main shaft
12: countershaft
20: oil pump
21: oil filter
30: combustion chamber
32: spark plug
33: camshaft holder
35: intake-side limit switch
36: exhaust-side limit switch
38: tubular member
40: variable valve gear
41: intake valve
42: intake-side camshaft
43: intake-side cam carrier
43A: high-speed-side cam lobe
43B: low-speed-side cam lobe
43D: lead groove cylindrical part
44: lead groove 44c: annular lead groove
44l: left shift lead groove
44r: right shift lead groove
47: intake-side driven gear
51: exhaust valve
52: exhaust-side camshaft
53: exhaust-side cam carrier
53A: high-speed-side cam lobe
53B: low-speed-side cam lobe
53D: lead groove cylindrical part
54: lead groove
54c: annular lead groove
54l: left shift lead groove
54r: right shift lead groove
57: exhaust-side driven gear
61: idle gear
62: idle chain sprocket
66: cam chain
70: intake-side cam switch mechanism
71: intake-side switch drive shaft
71v: recess
72: intake rocker arm
Ca: cam mechanism
73: first switch pin
74: second switch pin
75: coil spring
76: lid member
77: intake-side hydraulic actuator
78: intake-side actuator housing
79: intake-side actuator driver
79h: long hole
80: exhaust-side cam switch mechanism
81: exhaust-side switch drive shaft
81v: recess
82: exhaust rocker arm
Cb: cam mechanism
83: first switch pin
84: second switch pin
86: lid member
87: exhaust-side hydraulic actuator
88: exhaust-side actuator housing
89: exhaust-side actuator driver
89h: long hole
$90_H$: high-speed-side supply and discharge oil passage
$90_{HH}$: long groove
$90_L$: low-speed-side supply and discharge oil passage
$90_{RR}$: long groove
91: linear solenoid valve
92: electromagnetic solenoid
92c: electromagnetic coil
92p: plunger
93: sleeve
93R: matching surface
$93_1$: hydraulic pressure supply port
$93_H$: high-speed-side supply and discharge port
$93_L$: low-speed-side supply and discharge port
$93_D$: drain port
94: spool valve
$94_1$: hydraulic pressure supply groove
$94_D$: drain groove
95: spring
100: motorcycle
102: head pipe
103: main frame
104: seat rail
105: front fork
106: front wheel
107: pivot shaft
108: swingarm
109: rear wheel
110: link mechanism
111: rear cushion
112: driving sprocket
113: driven sprocket
114: roller chain
116: fuel tank
117: main seat
118: pillion seat
121: throttle body
122: air cleaner
125: exhaust tube

What is claimed is:

1. A sensor mounting structure for an engine including: a crankcase, a cylinder block having a plurality of cylinders formed therein, a cylinder head, and a cylinder head cover stacked on and fastened integrally with the crankcase in a direction of a cylinder axis which is a central axis of each of the cylinders of the engine, the sensor mounting structure comprising:
   a valve gear provided at the cylinder head;
   a sensor for detecting an operation of the valve gear, the sensor being mounted in a sensor mounting hole formed in a head inner wall which is a part of the cylinder head, the inner wall being separated from and covered with the cylinder head cover, and
   a tubular member interposed between an outer surface of the cylinder head cover and the head inner wall, the tubular member having a first end opening opened to an area outside of the cylinder head cover, and a second end opening opposed to the sensor mounting hole.

2. The sensor mounting structure for an engine according to claim 1, wherein the valve gear includes:
   a camshaft oriented in a vehicle width direction and rotatably provided at the cylinder head,
   a cam carrier as a cylindrical member axially slidably fitting to an outer circumference of the camshaft while prohibited from relatively rotating, a plurality of cam lobes being different in cam profile from each other being formed axially adjacent to each other in an outer circumferential surface of the cam carrier, and
   a cam switch mechanism for axially shifting a switch drive shaft to shift the cam carrier, to switch the cam lobes acting on a valve during engine operation,
   and wherein the sensor is a limit switch that detects a recess or a projection provided at the switch drive shaft.

3. The sensor mounting structure for an engine according to claim 2, wherein
   the switch drive shaft includes a plurality of the recesses or projections, and
   a plurality of sensors are provided, with one of the sensors respectively disposed for each of the recesses or projections, in order to sense movement of the plurality of recesses or projections.

4. The sensor mounting structure for an engine according to claim 2, comprising a plurality of the switch drive shafts and a plurality of sensors, wherein at least one sensor is respectively disposed for each of the switch drive shafts, to sense movement of the recess or the projection provided at each of the plurality of switch drive shafts.

5. The sensor mounting structure for an engine according to claim 1, wherein the valve gear includes:
a camshaft rotatably provided at the cylinder head, and
a cam carrier for switching a cam lobe acting on a valve, and wherein the sensor is operable to detect operation of the cam carrier.

6. The sensor mounting structure for an engine according to claim 5, wherein the cam carrier is disposed at a lower position as compared to the camshaft.

7. A sensor mounting structure for an engine including a crankcase, a cylinder block having a plurality of cylinders formed therein, a cylinder head, and a cylinder head cover stacked on and fastened integrally with the crankcase in a direction of a cylinder axis which is a central axis of each of the cylinders of the engine, the sensor mounting structure comprising:
a valve gear provided at the cylinder head; and
a sensor for detecting an operation of the valve gear, the sensor being mounted in a sensor mounting hole formed in a head inner wall of the cylinder head covered with the cylinder head cover,
wherein:
the engine is an inline multi-cylinder engine,
a spark plug is mounted on the cylinder head for each of the cylinders, and
the sensor is disposed between two adjacent ones of the spark plugs.

8. The sensor mounting structure for an engine according to claim 7, wherein the valve gear includes two parallel camshafts rotatably supported at the cylinder head, and the sensor is disposed between the two camshafts.

9. The sensor mounting structure for an engine according to claim 7, further comprising:
a tubular member interposed between an outer surface of the cylinder head cover and the head inner wall, wherein the tubular member has a first end opening opened to an area outside of the cylinder head cover and has a second end opening opposed to the sensor mounting hole.

10. The sensor mounting structure for an engine according to claim 9, wherein the tubular member is formed integrally with the cylinder head cover.

11. The sensor mounting structure for an engine according to claim 9, wherein the tubular member has a shape of a tube having a tube central axis which is inclined relative to the cylinder axis by a certain angle.

12. The sensor mounting structure for an engine according to claim 9, wherein the valve gear includes two parallel camshafts rotatably supported at the cylinder head, and the sensor is disposed between the two camshafts.

13. The sensor mounting structure for an engine according to claim 9, wherein the valve gear includes
a camshaft oriented in a vehicle width direction and rotatably provided at the cylinder head,
a cam carrier as a cylindrical member axially slidably fitting to an outer circumference of the camshaft while prohibited from relatively rotating, a plurality of cam lobes being different in cam profile from each other being formed axially adjacent to each other in an outer circumferential surface of the cam carrier, and
a cam switch mechanism for axially shifting a switch drive shaft to shift the cam carrier, to switch the cam lobes acting on a valve during engine operation, and
the sensor is a limit switch that detects a recess or a projection provided at the switch drive shaft.

14. The sensor mounting structure for an engine according to claim 10, wherein the tubular member has a shape of a tube having a tube central axis which is inclined relative to the cylinder axis by a certain angle.

15. The sensor mounting structure for an engine according to claim 10, wherein the valve gear includes two parallel camshafts rotatably supported at the cylinder head, and the sensor is disposed between the two camshafts.

16. The sensor mounting structure for an engine according to claim 11, wherein the valve gear includes two parallel camshafts rotatably supported at the cylinder head, and the sensor is disposed between the two camshafts.

17. A sensor mounting structure for an engine including a crankcase, a cylinder block having a plurality of cylinders formed therein, a cylinder head, and a cylinder head cover stacked on and fastened integrally with the crankcase in a direction of a cylinder axis which is a central axis of each of the cylinders of the engine, the sensor mounting structure comprising:
a valve gear provided at the cylinder head; and
a sensor for detecting an operation of the valve gear, the sensor being mounted in a sensor mounting hole formed in a head inner wall which is a part of the cylinder head, the inner wall being separated from and covered with the cylinder head cover,
wherein the valve gear includes two parallel camshafts rotatably supported at the cylinder head, and the sensor is disposed between the two camshafts.

* * * * *